US008384791B2

(12) United States Patent
Porter et al.

(10) Patent No.: US 8,384,791 B2
(45) Date of Patent: Feb. 26, 2013

(54) VIDEO CAMERA FOR FACE DETECTION

(75) Inventors: Robert Mark Stefan Porter, Winchester (GB); Ratna Rambaruth, Guildford (GB); Simon Dominic Haynes, Basingstoke (GB); Clive Henry Gillard, Alton (GB)

(73) Assignee: Sony United Kingdom Limited, Weybridge (GB)

( * ) Notice: Subject to any disclaimer, the term of this patent is extended or adjusted under 35 U.S.C. 154(b) by 1324 days.

(21) Appl. No.: 10/537,275

(22) PCT Filed: Nov. 28, 2003

(86) PCT No.: PCT/GB03/05224
§ 371 (c)(1),
(2), (4) Date: Mar. 6, 2006

(87) PCT Pub. No.: WO2004/051981
PCT Pub. Date: Jun. 17, 2004

(65) Prior Publication Data
US 2006/0170791 A1    Aug. 3, 2006

(30) Foreign Application Priority Data
Nov. 29, 2002 (GB) .................. 0227915.6

(51) Int. Cl.
*H04N 5/228* (2006.01)
*H04N 5/76* (2006.01)
*H04N 9/47* (2006.01)
*H04N 7/18* (2006.01)
*G06K 9/00* (2006.01)
*G06K 9/46* (2006.01)
*G06K 9/32* (2006.01)

(52) U.S. Cl. ............ 348/222.1; 348/77; 348/231.3; 382/115; 382/128; 382/240; 382/298

(58) Field of Classification Search ........... 348/231.7, 348/77, 222.1, 231.3; 382/115–128, 240, 382/298–304
See application file for complete search history.

(56) References Cited

U.S. PATENT DOCUMENTS
(Continued)

FOREIGN PATENT DOCUMENTS
DE    196 00 958    1/1997
EP    0 330 455    8/1989
(Continued)

OTHER PUBLICATIONS

Patent Abstracts of Japan, Publication No. 01273505, Publication Date Nov. 1, 1989.

(Continued)

*Primary Examiner* — Aung S Moe
*Assistant Examiner* — Chia-Wei A Chen
(74) *Attorney, Agent, or Firm* — Oblon, Spivak, McClelland, Maier & Neustadt, L.L.P.

(57) ABSTRACT

A video camera arrangement comprises an image capture device; a face detector for detecting human faces in the captured video material and for generating face data identifying detected occurrences of faces in the captured video material; a data handling medium by which data representing the captured images is transmitted and/or stored; and a processor for generating data to be transmitted or stored by the data handling medium in dependence on the detection of faces in the captured images.

27 Claims, 26 Drawing Sheets

U.S. PATENT DOCUMENTS

| | | | |
|---|---|---|---|
| 5,812,193 A | | 9/1998 | Tomitaka et al. |
| 5,815,203 A * | | 9/1998 | Lee et al. .................. 348/240.3 |
| 5,864,363 A * | | 1/1999 | Giefing et al. ................ 348/143 |
| 5,999,214 A * | | 12/1999 | Inagaki .................. 348/211.12 |
| 6,088,156 A * | | 7/2000 | Kato ............................ 359/422 |
| 6,297,846 B1 * | | 10/2001 | Edanami ...................... 348/239 |
| 6,408,301 B1 * | | 6/2002 | Patton et al. ................. 707/102 |
| 6,593,956 B1 * | | 7/2003 | Potts et al. ................ 348/14.09 |
| 6,606,458 B2 * | | 8/2003 | Umeda et al. ................ 396/110 |
| 6,686,970 B1 * | | 2/2004 | Windle ......................... 348/584 |
| 6,714,665 B1 * | | 3/2004 | Hanna et al. .................. 382/117 |
| 6,774,917 B1 * | | 8/2004 | Foote et al. ................... 715/700 |
| 6,961,446 B2 * | | 11/2005 | Imagawa et al. ............. 382/103 |
| 2001/0043727 A1 | | 11/2001 | Cooper |
| 2001/0053292 A1 | | 12/2001 | Nakamura |
| 2001/0055058 A1* | | 12/2001 | Milovanovic et al. ..... 348/14.01 |
| 2002/0031262 A1 | | 3/2002 | Imagawa et al. |
| 2002/0113862 A1* | | 8/2002 | Center et al. ............... 348/14.08 |
| 2002/0181799 A1* | | 12/2002 | Matsugu et al. ............. 382/260 |
| 2003/0030735 A1* | | 2/2003 | Ike ............................ 348/240.3 |
| 2003/0035479 A1* | | 2/2003 | Kan et al. ................ 375/240.12 |
| 2003/0085997 A1* | | 5/2003 | Takagi et al. ................ 348/143 |
| 2003/0118217 A1* | | 6/2003 | Kondo et al. ................ 382/117 |
| 2003/0133599 A1* | | 7/2003 | Tian et al. .................... 382/118 |
| 2003/0161506 A1* | | 8/2003 | Velazquez et al. ........... 382/118 |
| 2004/0005083 A1* | | 1/2004 | Fujimura et al. ............. 382/103 |
| 2004/0101178 A1* | | 5/2004 | Fedorovskaya et al. ...... 382/128 |
| 2004/0101212 A1* | | 5/2004 | Fedorovskaya et al. ...... 382/305 |
| 2011/0134271 A1* | | 6/2011 | DeLuca et al. ............ 348/222.1 |

FOREIGN PATENT DOCUMENTS

| | | |
|---|---|---|
| EP | 1 158 786 | 11/2001 |
| GB | 2 361 097 | 10/2001 |
| JP | 11-331827 | 11/1999 |
| WO | WO 99/60788 | 11/1999 |
| WO | WO 00/16243 | 3/2000 |

OTHER PUBLICATIONS

H. Schneiderman and T. Kanade, "A statistical model for 3D object detection applied to faces and cars," IEEE Conference on Computer Vision and Pattern Detection, 2000.

H. Schneiderman and T. Kanade, "Probabilistic modelling of local appearance and spatial relationships for object detection," IEEE Conference on Computer Visioni and Pattern Detection, 1998.

H. Schneiderman, "A statistical approach to 3D object detection applied to faces and cars," PhD thesis, Robotics Institute, Carnegie Mellon University, 2000.

E. Hjelmas and B.K. Low, "Face Detection: A Survey," Computer Vision and Image Understanding, No. 83, pp. 236-274, 2001.

M.-H. Yang, D. Kriegman and N. Ahuja, "Detecting Faces in Images: A Survey,"IEEE Trans. on Pattern Analysis and Machine Intelligence, vol. 24, No. 1, pp. 34-58, Jan. 2002.

Office Action issued Apr. 6, 2011, in European Patent Application No. 03812217.2 (in English language).

* cited by examiner

VIDEO CAMERA FOR FACE DETECTION

This invention relates to video cameras.

Video camera/recorder arrangements, including so called camcorders, are commonly used in home and professional applications. Generally they store audio and video material on tape media, but other storage media such as optical or magnetic disk storage have been proposed.

Recently it has been proposed that professional camcorders might store some so-called "metadata" (additional data) along with the audio and video material that they capture. This metadata could be stored on the tape with the audio and video information, or it could be stored on a separate recording media such as a flash memory card, or it could be transmitted by a wireless link to an external database. In any of these situations, a main purpose of the metadata is to assist users in making full use of the material later.

Some metadata is generated by a human operator (e.g. using a keyboard) and might define the location of filing; the actors/presenters; the date and time; the production staff; the type of camera; whether or not a current clip is considered to be a "good shot" by the cameraman etc. Another class of automated metadata may be generated by the camcorder and associated equipment, for example defining the focus, zoom and aperture settings of the camera lens, the geographical position (via a GPS receiver), the camera's maintenance schedule and so on.

While this latter class of metadata is useful to an extent, when a user later needs to locate a particular video clip from a large group of archived video clips, the more useful metadata is the first class, that generate by a human operator. For example, the later user is far more likely to search for a clip containing a particular celebrity than a clip in which a Fuji lens was used at an aperture f1.8. However, although the human-generated metadata is often the more useful, it is very time-consuming (and therefore expensive) for someone to enter all of the required data at or soon after capture of the material.

This invention provides a video camera arrangement comprising:

an image capture device;

a face detector for detecting human faces in the captured video material and for generating face data identifying detected occurrences of faces in the captured video material;

a data handling medium by which data representing the captured images is transmitted and/or stored; and a processor for generating data to be transmitted or stored by the data handling a medium in dependence on the detection of faces in the captured images.

The invention addresses the above problems by, in at least some embodiments, providing a new class of machine-generated metadata, namely face images, which can be stored along with the captured video material, but which has a level of usefulness (to a later user to establish quickly the content of the video material) much more on a level with human-generated metadata. In other embodiments the nature of image signals communicated from the camera arrangement to a remote node can be altered in dependence on the face detection, for example to achieve a reduction in or a better use of available transmission bandwidth.

The occurrences of faces may be treated as simply an identification of an image (e.g. a field or frame) but preferably also include a position within that image.

The camera arrangement is preferably, though not necessarily, a unitary arrangement otherwise knows as a camcorder.

Further respective aspects and features of the invention are defined in the appended claims.

Embodiments of the invention will now be described, by way of example only, with reference to the accompanying drawings, throughout which like parts are defined by like numerals, and in which.

Figure 5:
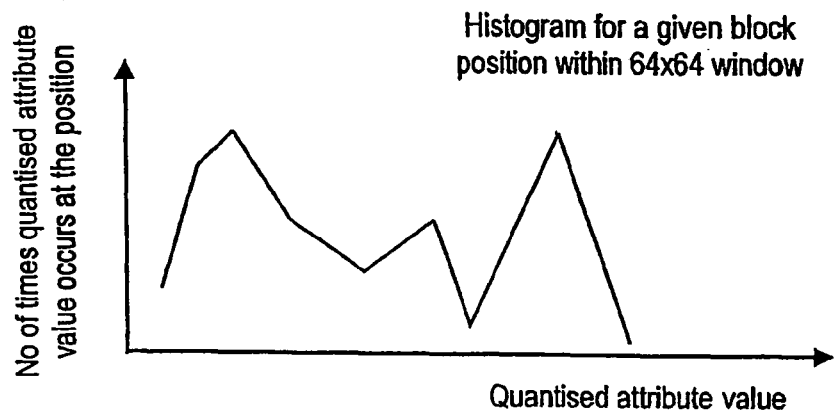
Figure 6:
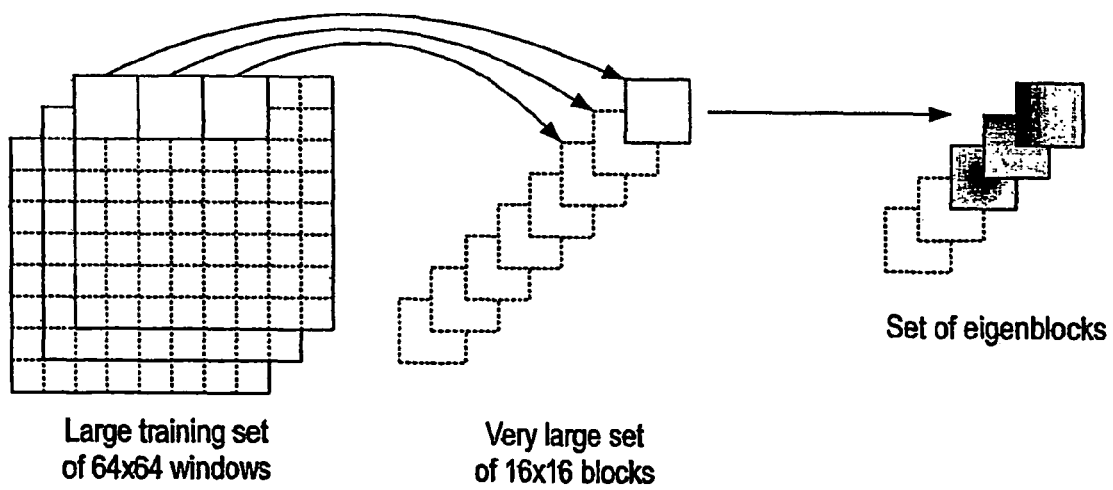
Figure 7:
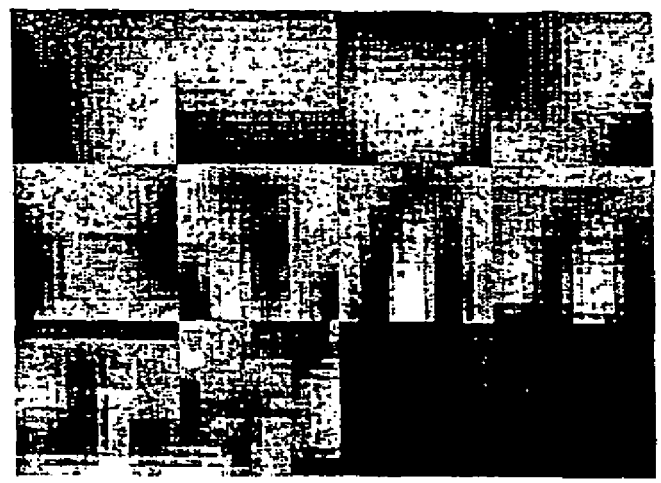
Figure 8:
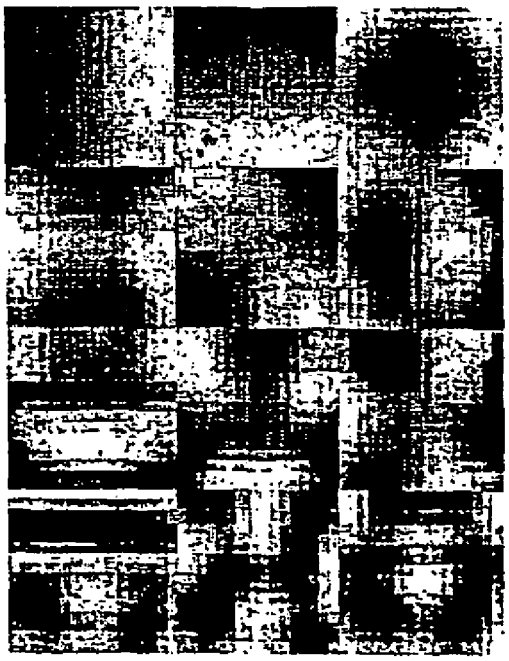
Figure 9:
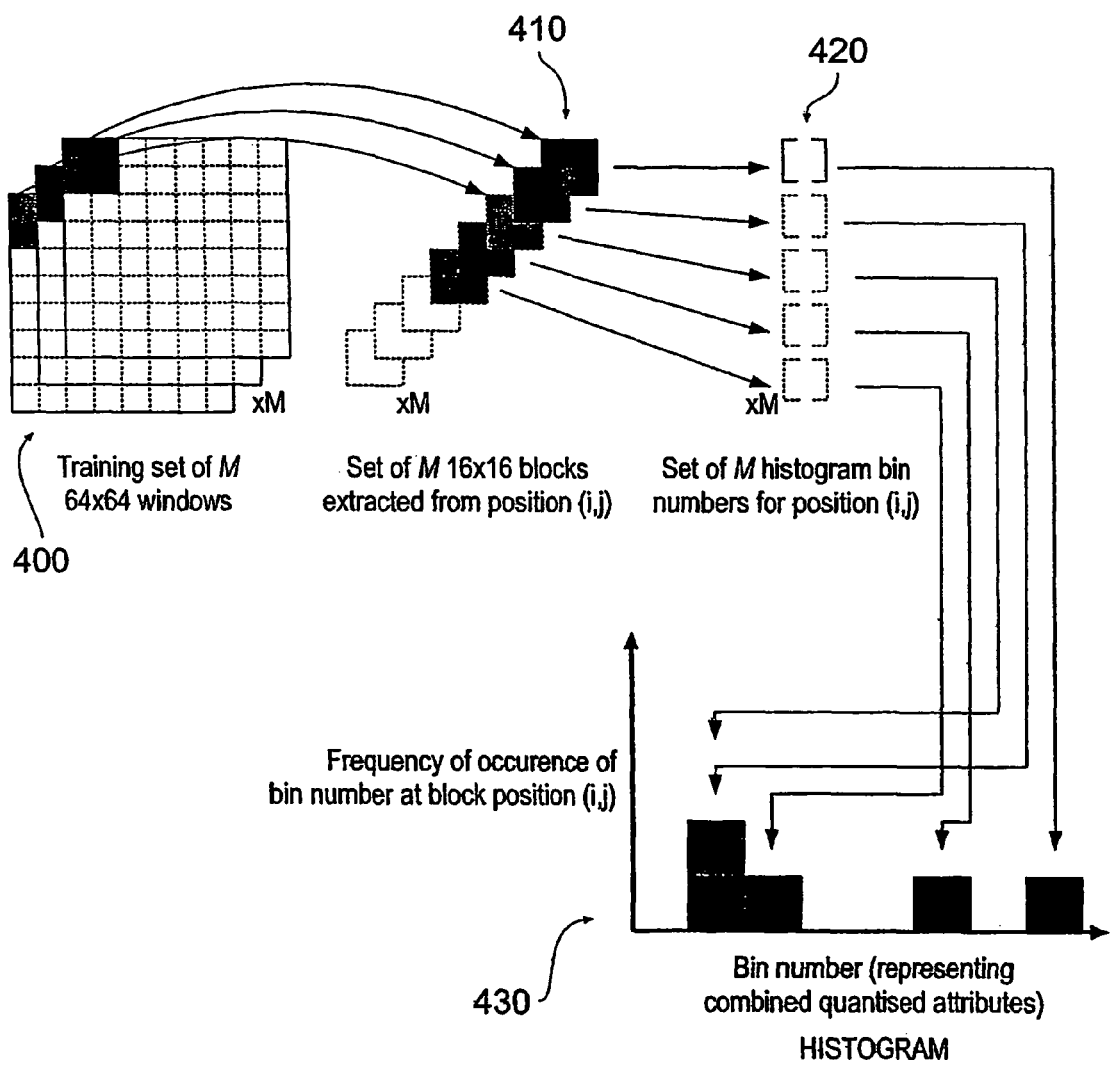
Figure 11:
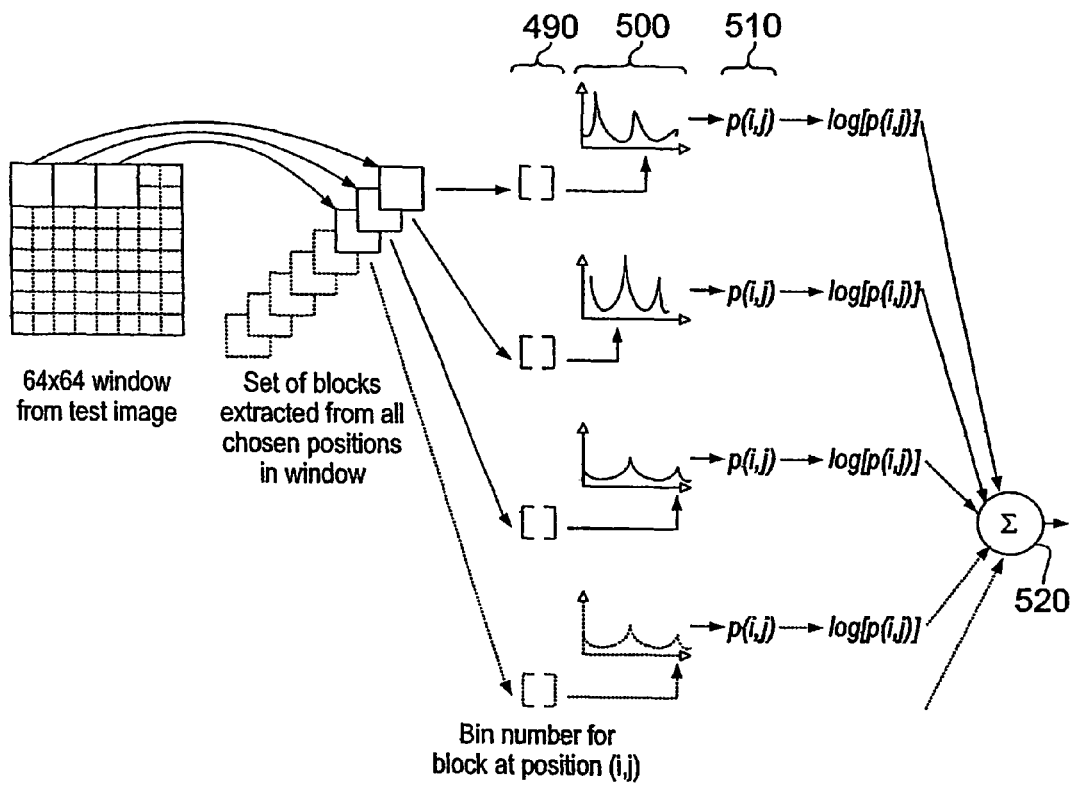
Figure 10:
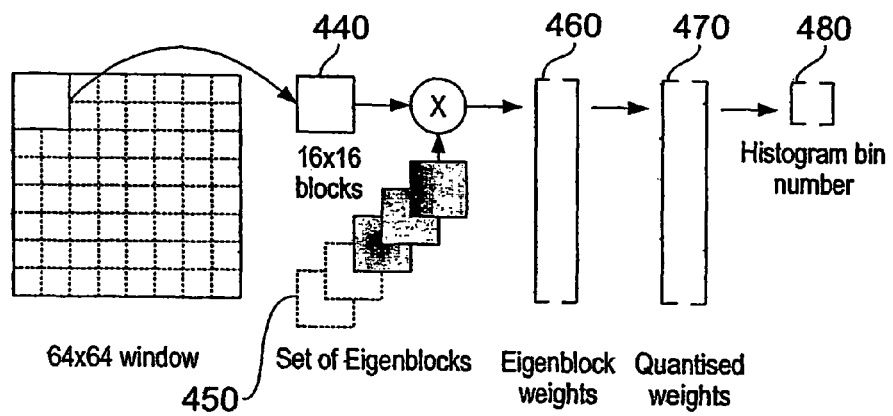
Figure 14:
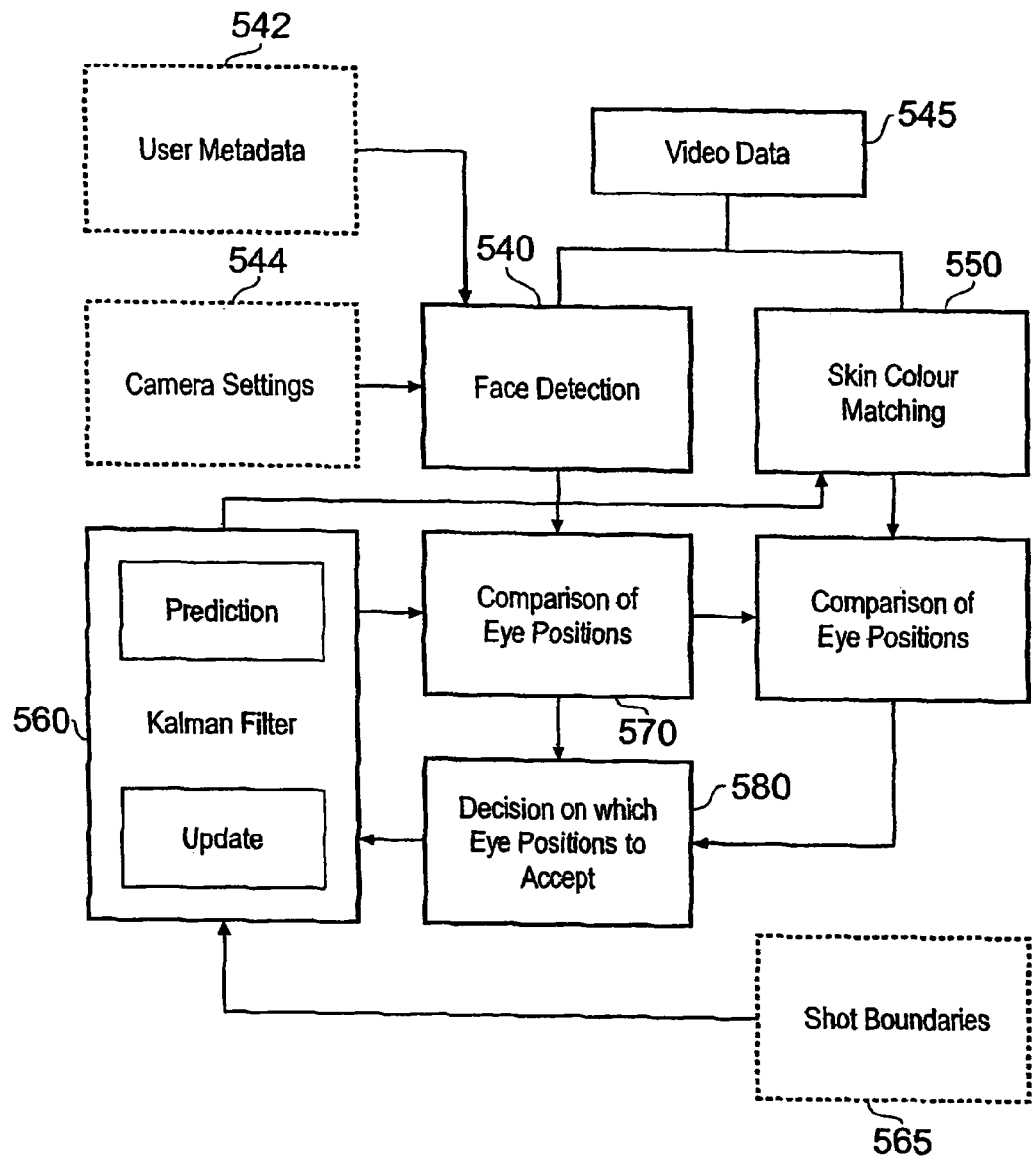
Figure 15A:
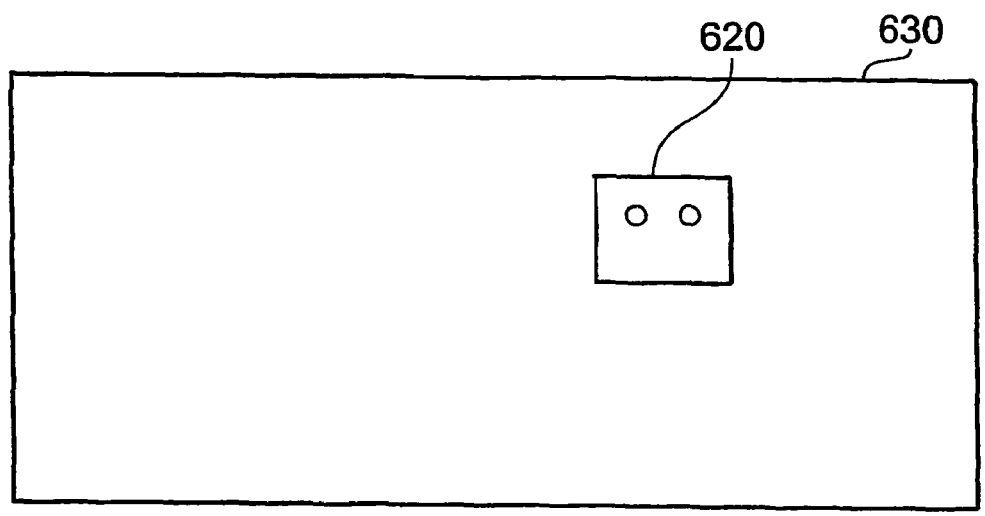
Figure 15B:
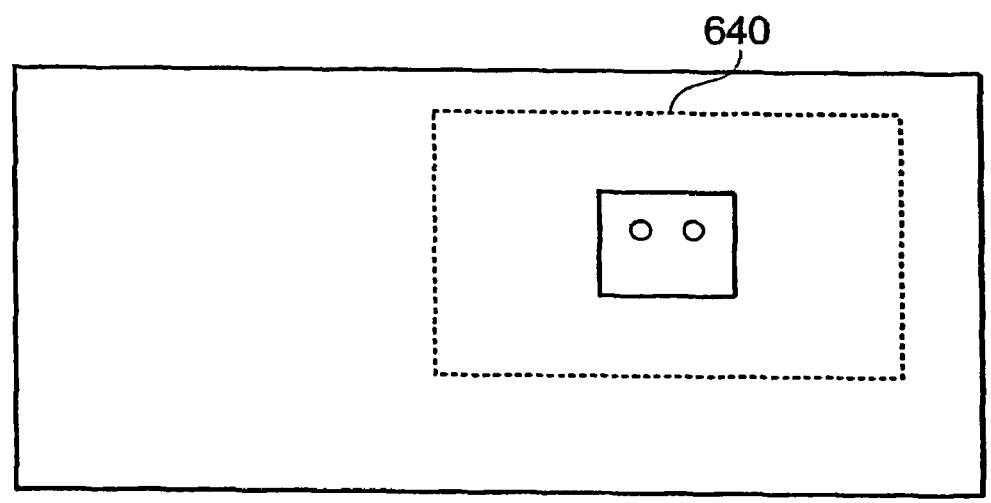
Figure 16:
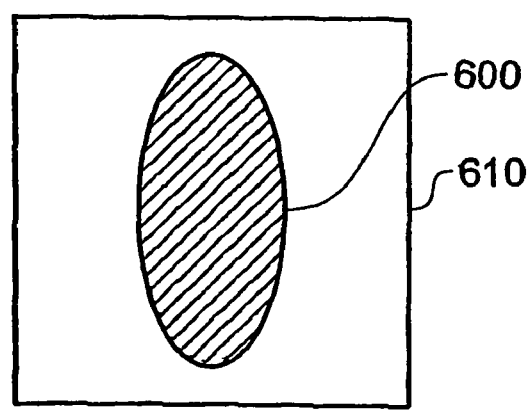
Figure 17A:
Figure 17B:
Figure 17C:
Figure 18:
Figure 19A:
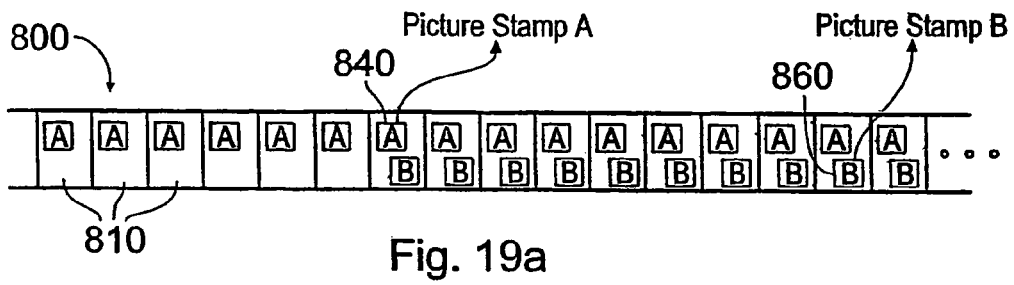
Figure 19B:
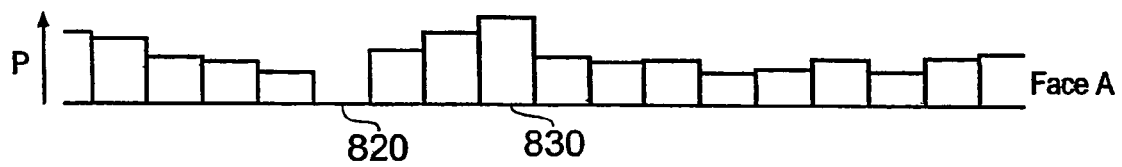
Figure 19C:
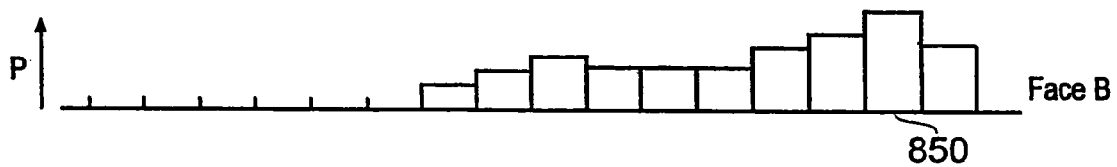
Figure 21A:
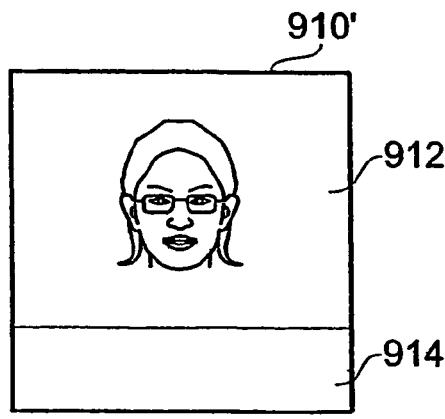
Figure 21B:
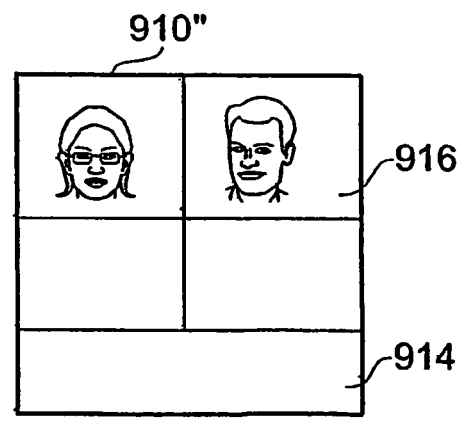
Figure 20:
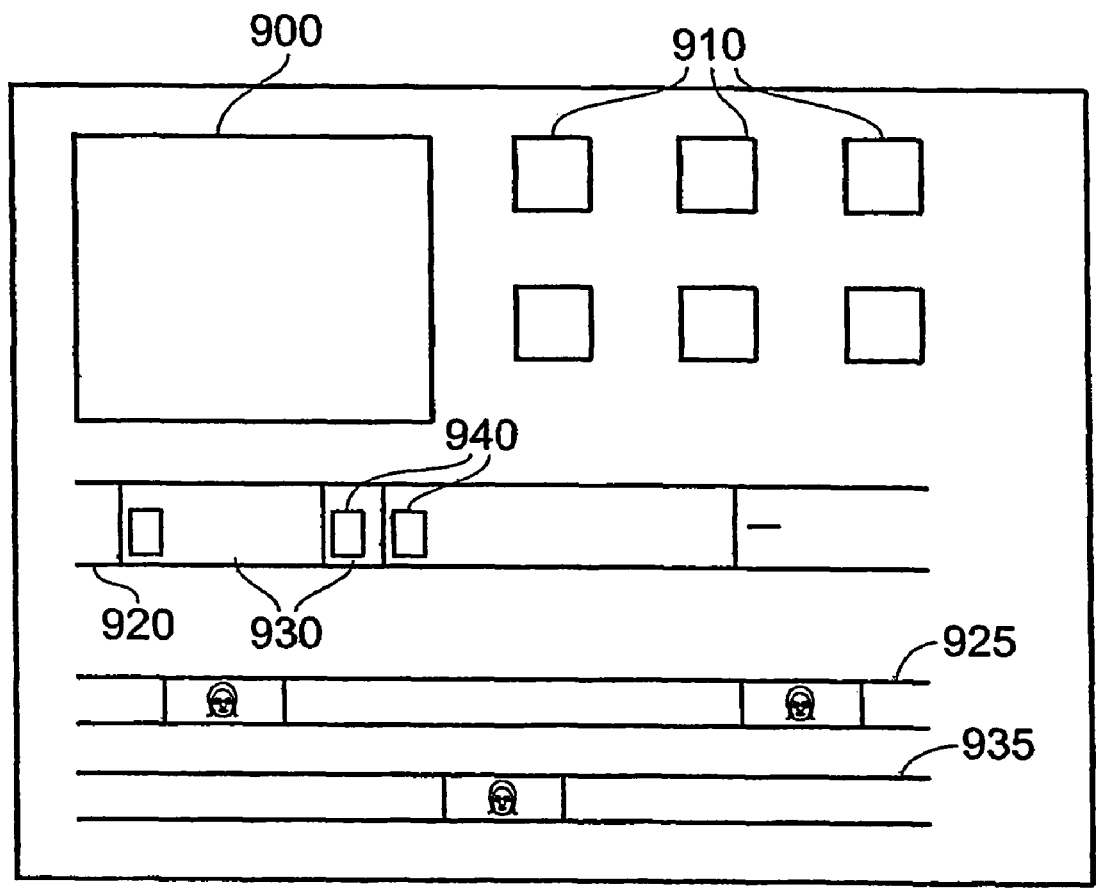
Figure 22A:
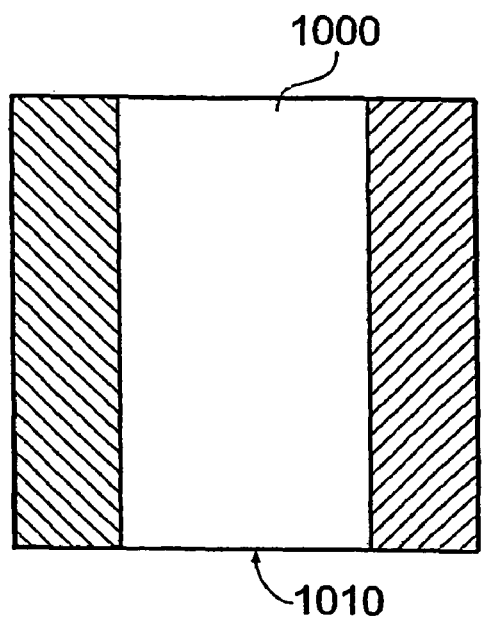
Figure 22B:
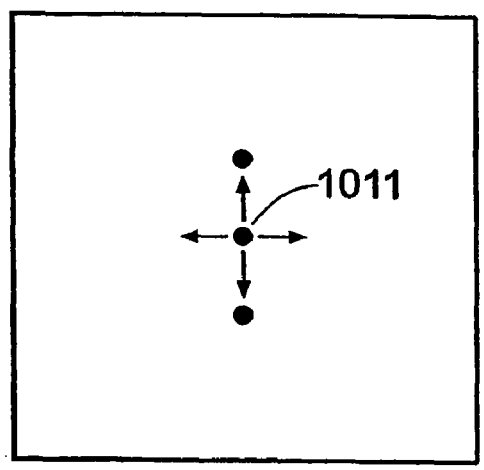
Figure 22C:
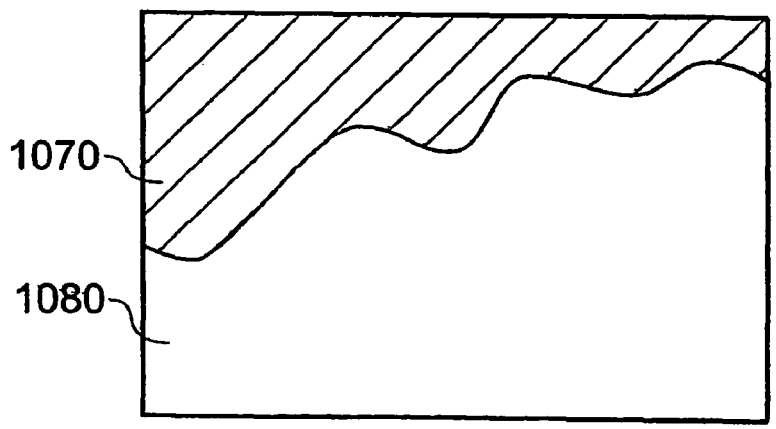
Figure 23:
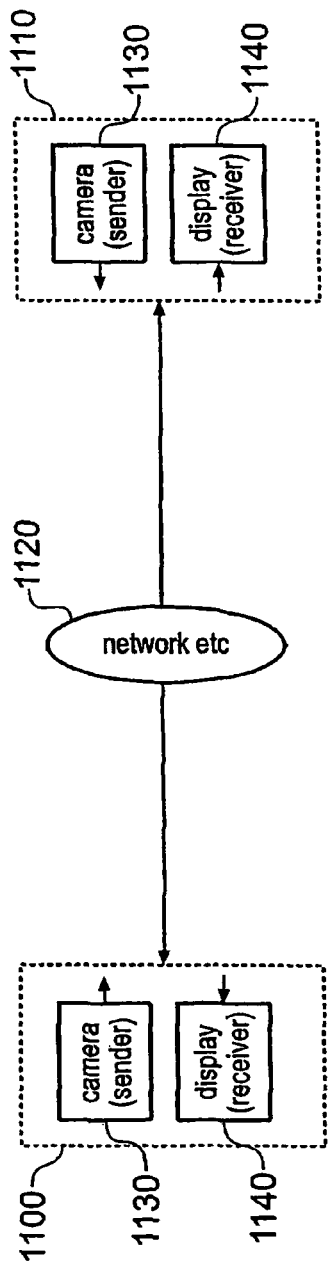
Figure 24:
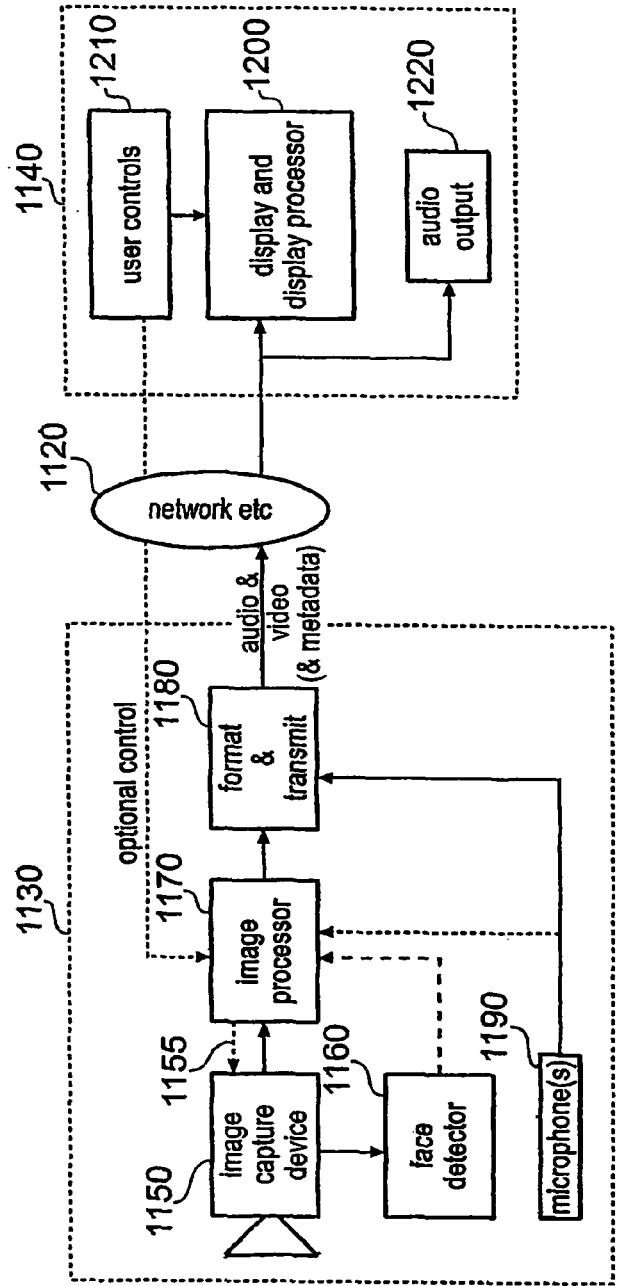
Figure 25:
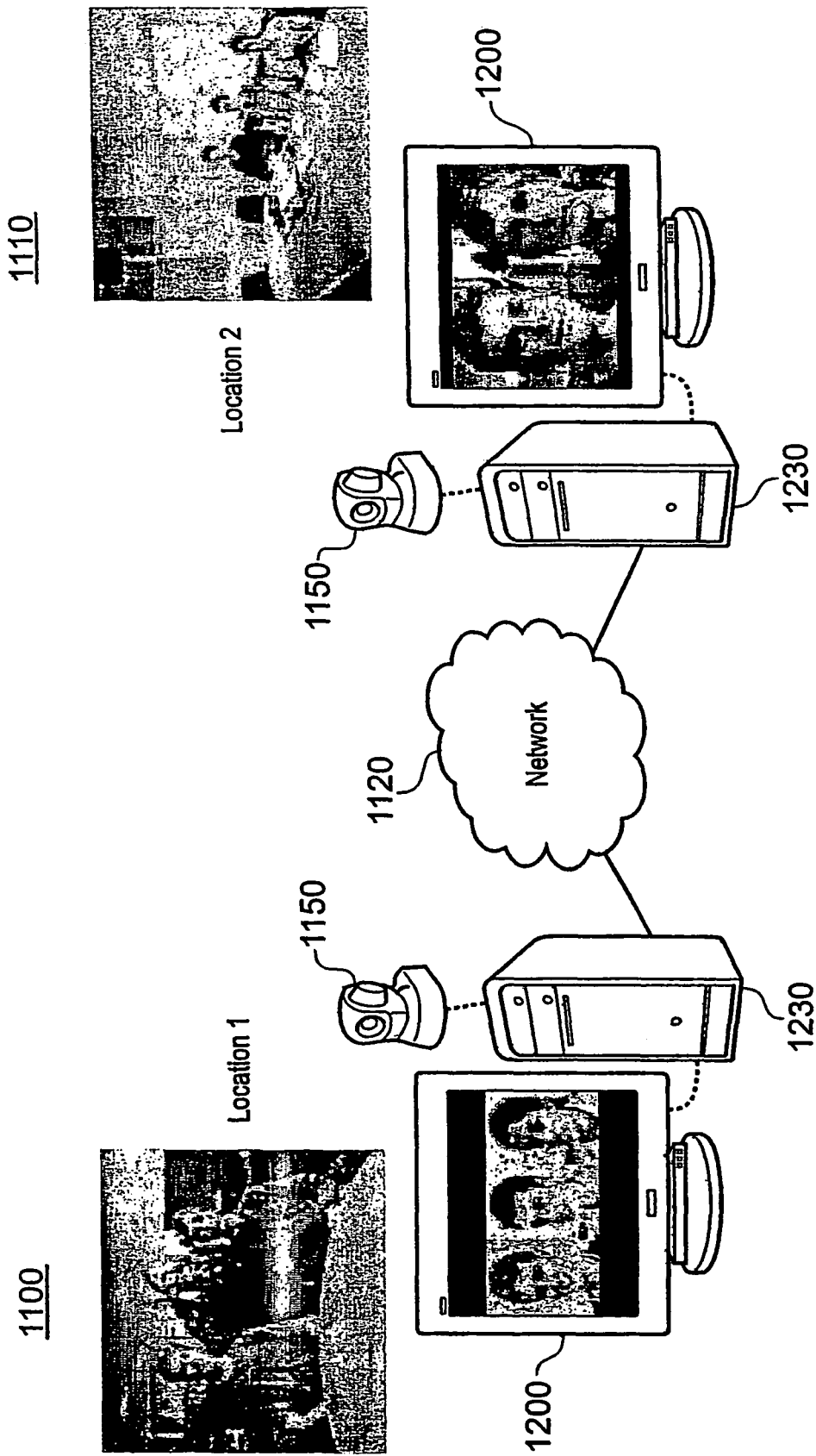
Figure 26:
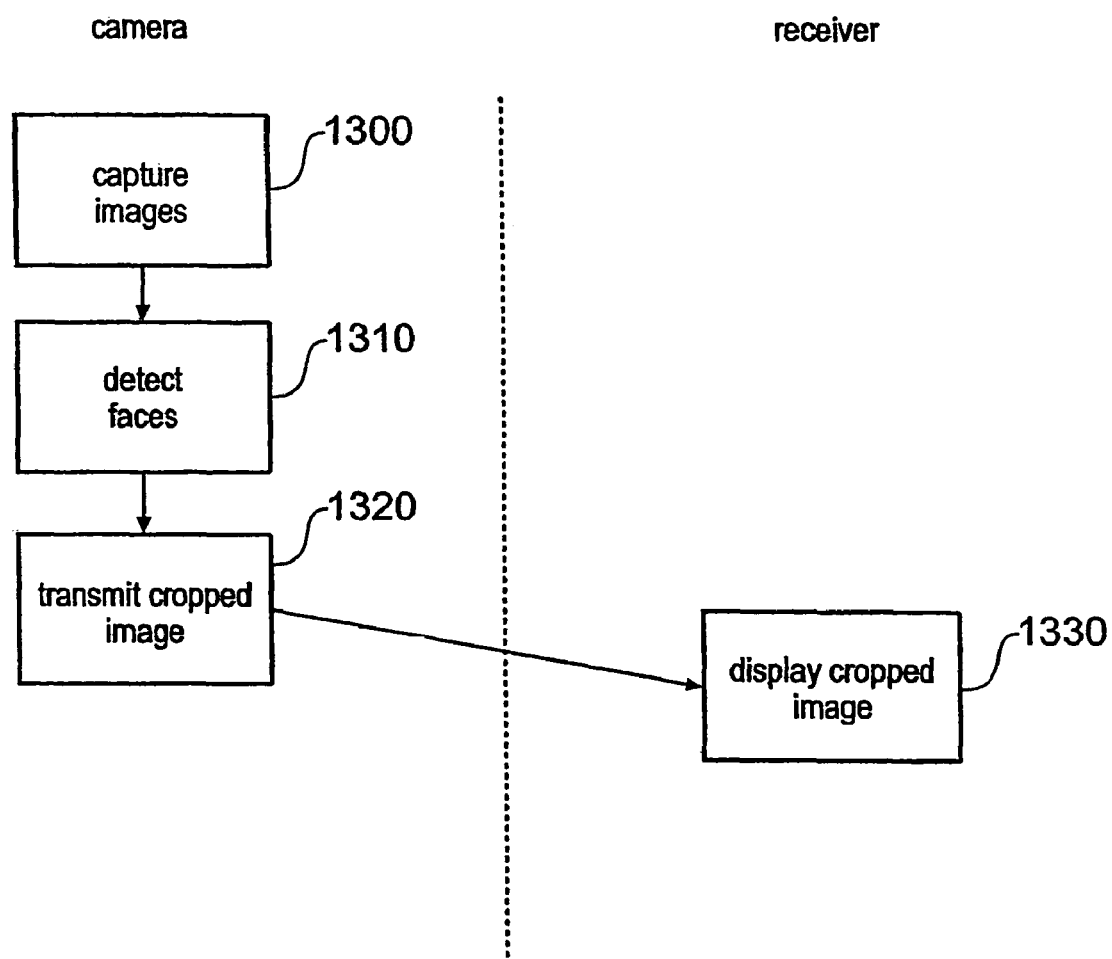
Figure 27B:
Figure 27A:
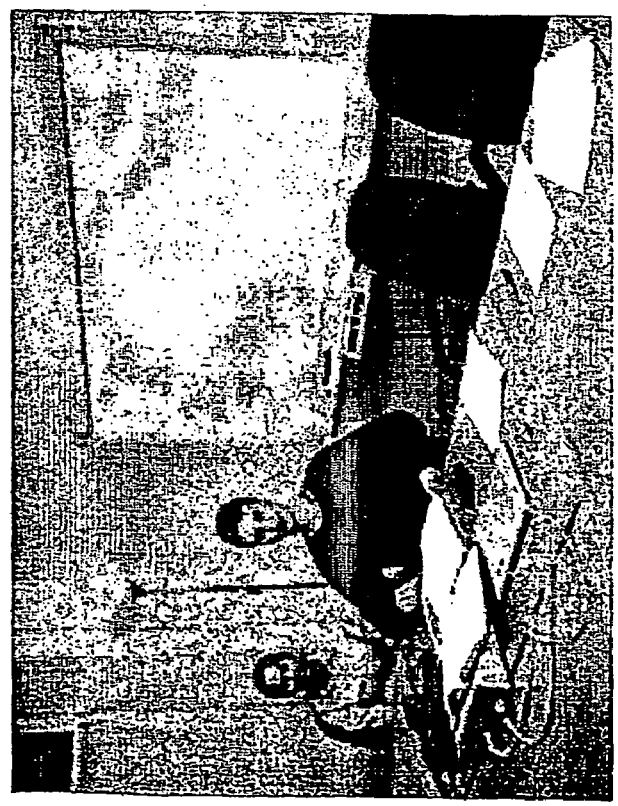
Figure 28:
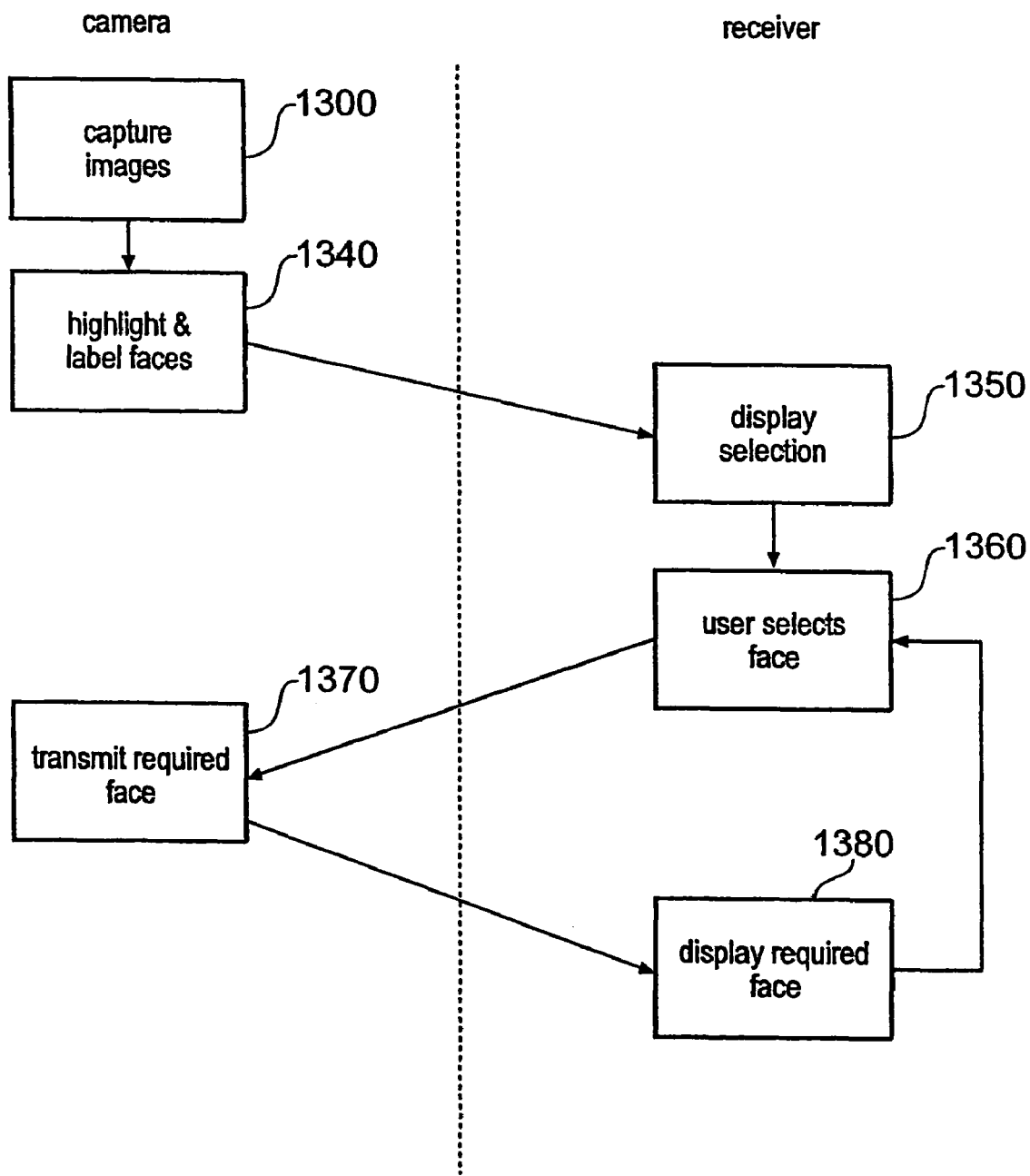
Figure 29:
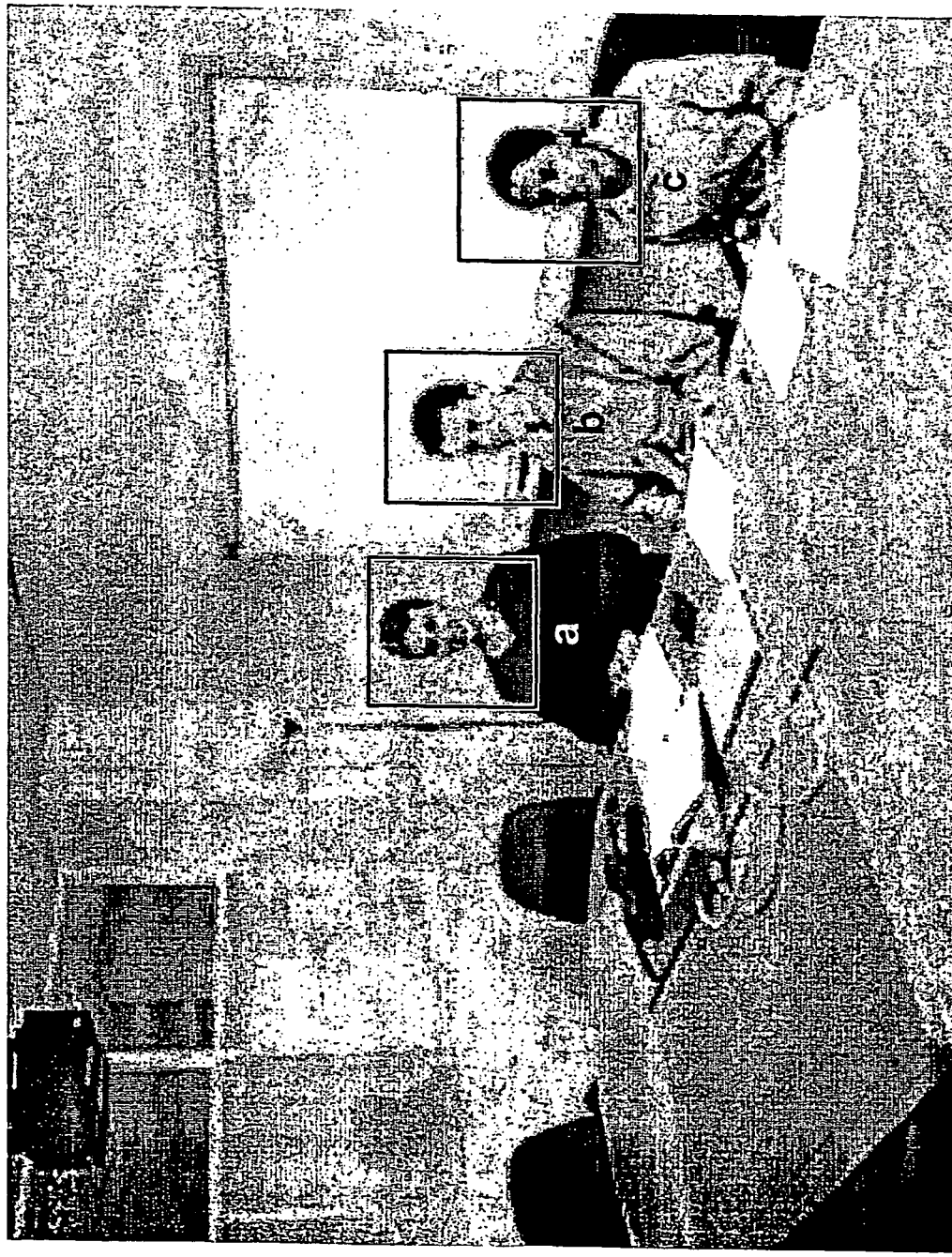
Figure 30:
Figure 31:
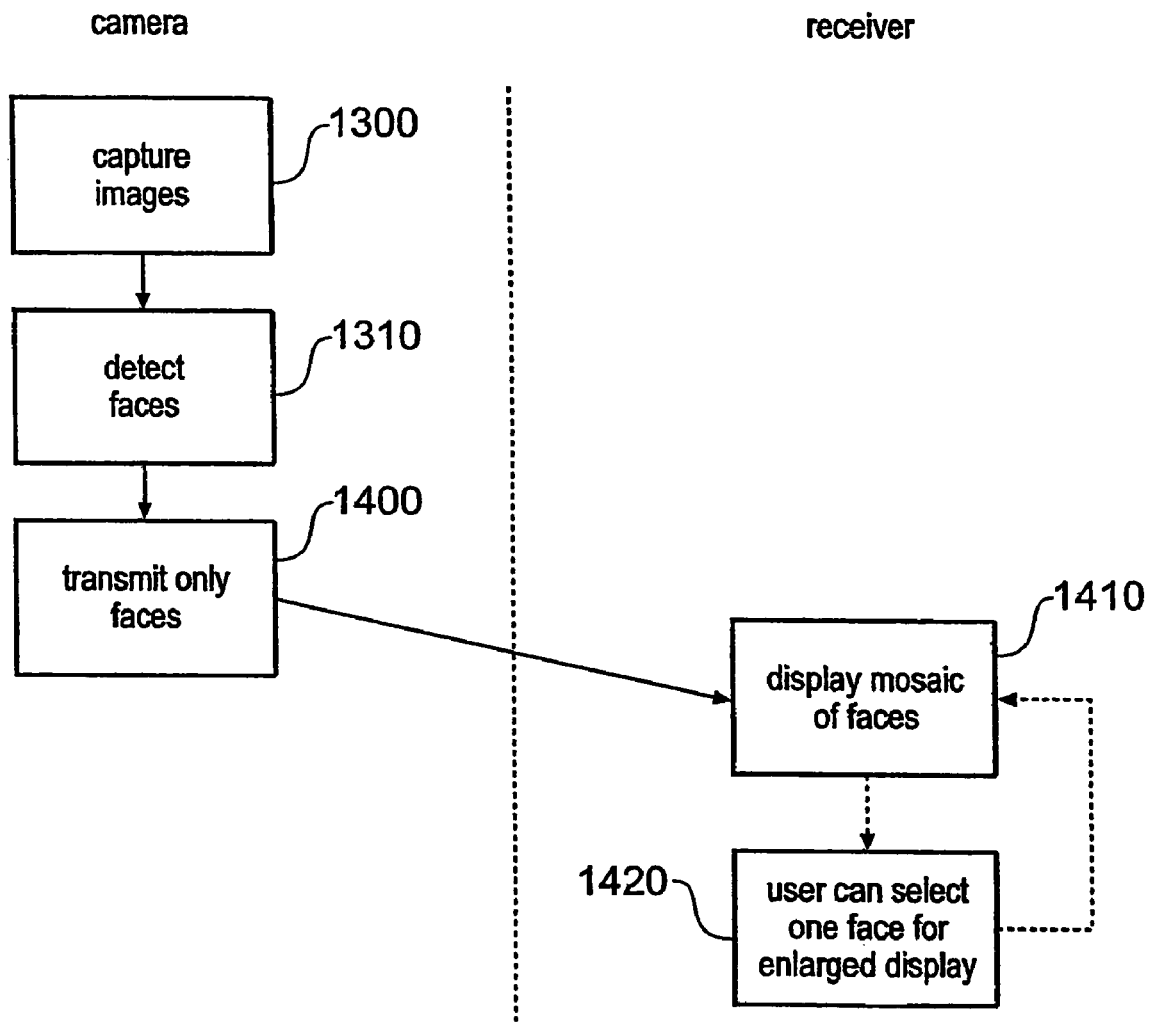
Figure 32:

FIG. 5 schematically illustrates a feature histogram;

FIG. 6 schematically illustrates a sampling process to generate eigenblocks;

FIGS. 7 and 8 schematically illustrates sets of eigenblocks;

FIG. 9 schematically illustrates a process to build a histogram representing a block position;

FIG. 10 schematically illustrates the generation of a histogram bin number,

FIG. 11 schematically illustrates the calculation of a face probability,

FIGS. 12*a* to 12*f* are schematic examples of histograms generated using the above methods;

FIGS. 13*a* to 13*g* schematically illustrate so-called multi-scale face detection;

FIG. 14 schematically illustrates a face tracking algorithm;

FIGS. 15*a* and 15*b* schematically illustrate the derivation of a search area used for skin colour detection;

FIG. 16 schematically illustrates a mask applied to skin colour detection;

FIGS. 17*a* to 17*c* schematically illustrate the use of the mask of FIG. 16;

FIG. 18 is a schematic distance map;

FIGS. 19*a* to 19*c* schematically illustrate the use of face tracking when applied to a video scene;

FIG. 20 schematically illustrates a display screen of a non-linear editing system;

FIGS. 21*a* and 21*b* schematically illustrate clip icons;

FIGS. 22*a* to 22*c* schematically illustrate a gradient pre-processing technique;

FIG. 23 schematically illustrates a video conferencing system;

FIGS. 24 and 25 schematically illustrate a video conferencing system in greater detail;

FIG. 26 is a flowchart schematically illustrating one mode of operation of the system of FIGS. 23 to 25;

FIGS. 27*a* and 27*b* are example images relating to the flowchart of FIG. 26;

FIG. 28 is a flowchart schematically illustrating another mode of operation of the system of FIGS. 23 to 25;

FIGS. 29 and 30 are example images relating to the flowchart of FIG. 28;

FIG. 31 is a flowchart schematically illustrating another mode of operation of the system of FIGS. 23 to 25;

FIG. 32 is an example image relating to the flowchart of FIG. 31; and

Figure 1:
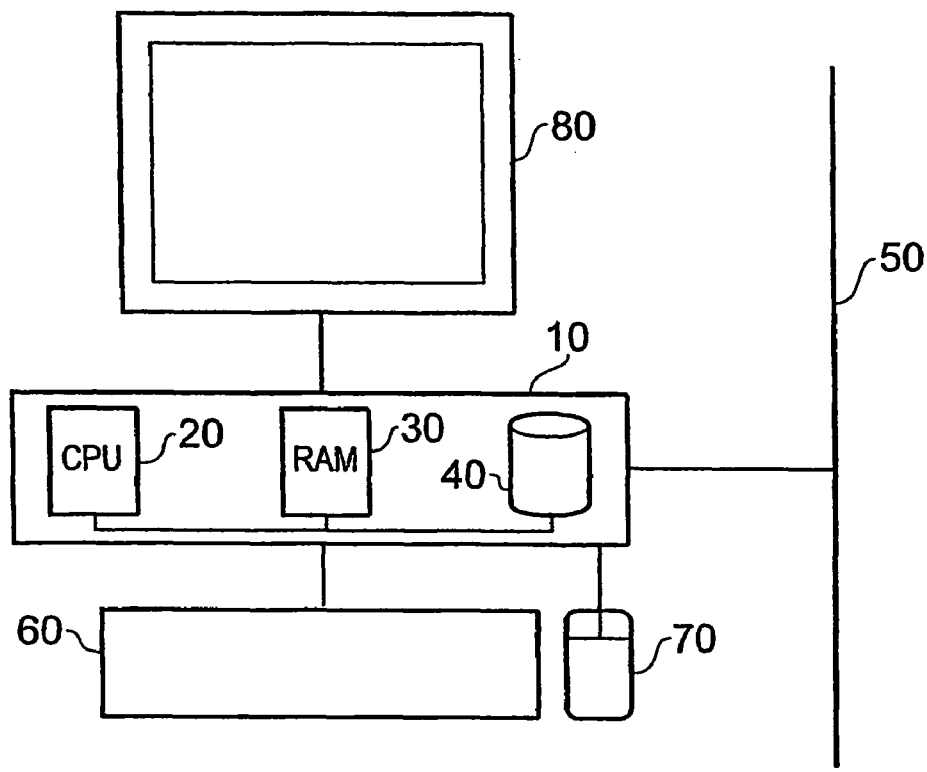
FIG. 1 is a schematic diagram of a general purpose computer system for use as a face detection system and/or a non-linear editing system.
Figure 33:
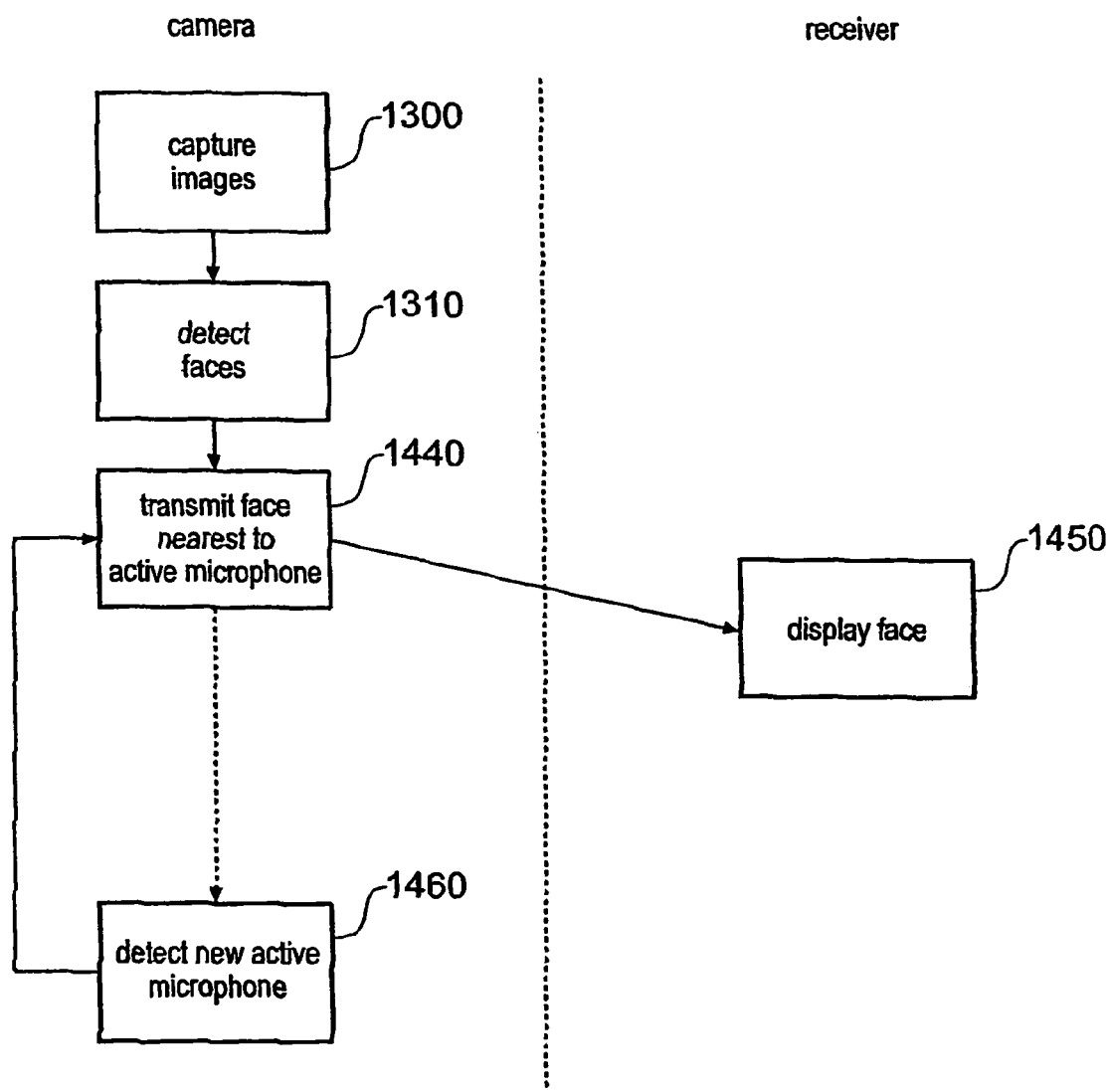
Figure 34:
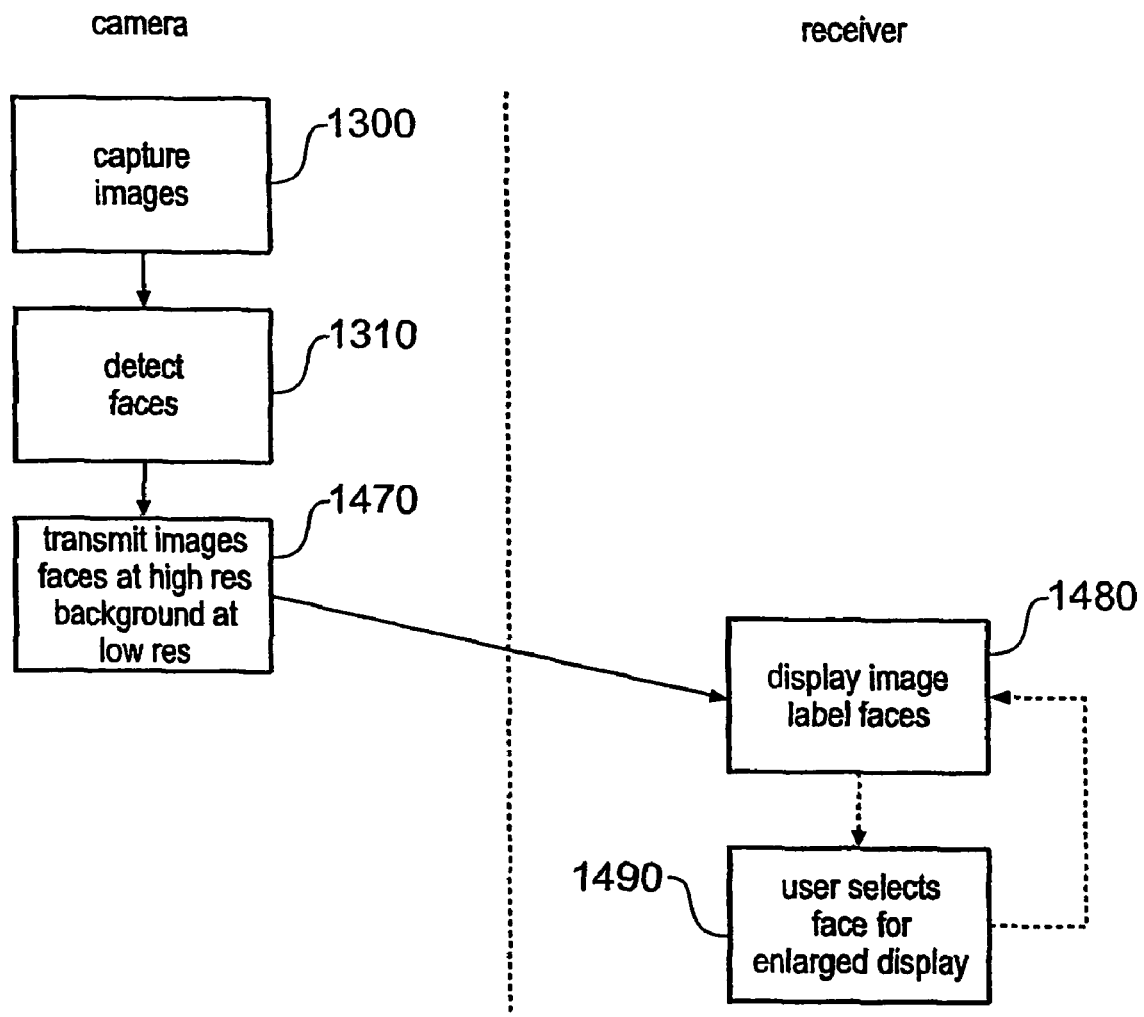

FIGS. 33 and 34 are flowcharts schematically illustrating further modes of operation of the system of FIGS. 23 to 25;

FIG. 1 is a schematic diagram of a general purpose computer system for use as a face detection system and/or a non-linear editing system. The computer system comprises a processing until 10 having (amongst other conventional components) a central processing unit (CPU) 20, memory such as a random access memory (RAM) 30 and non-volatile storage such as a disc drive 40. The computer system may be connected to a network 50 such as a local area network or the Internet (or both). A keyboard 60, mouse or other user input device 70 and display screen 80 are also provided. The skilled man will appreciate that a general purpose computer system may include many other conventional parts which need not be described here.

Figure 2:
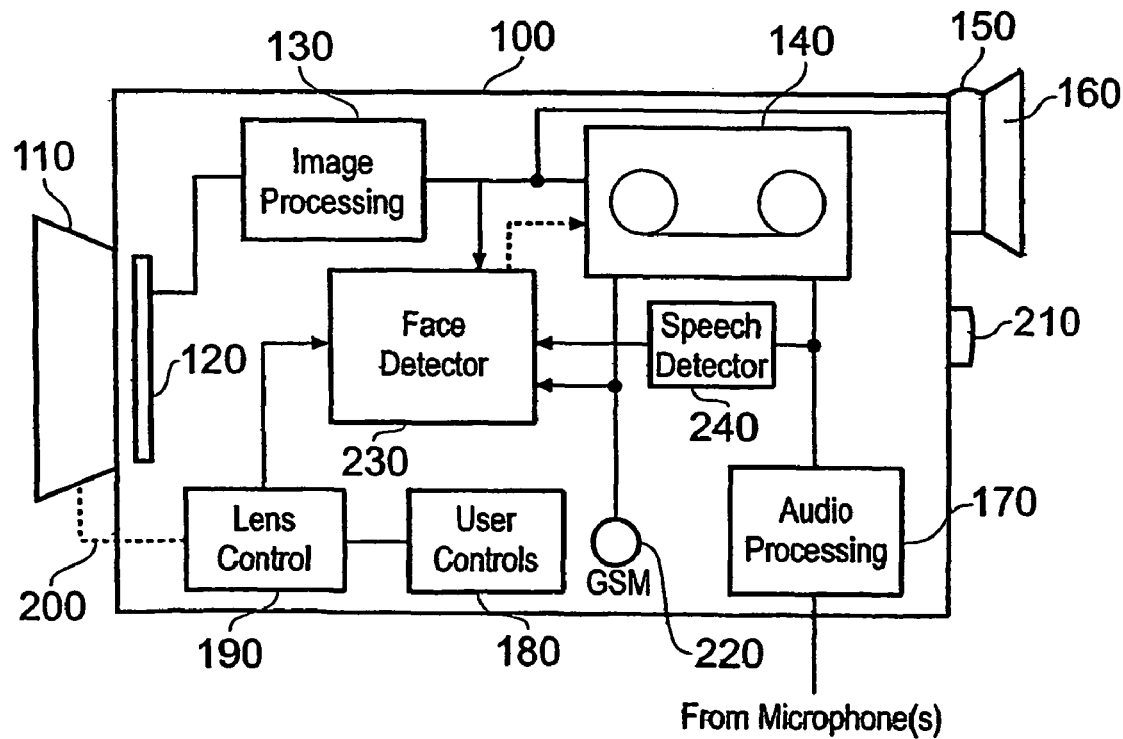
FIG. 2 is a schematic diagram of a video camera-recorder (camcorder) using face detection.

FIG. 2 is a schematic diagram of a video camera-recorder (camcorder) using face detection. The camcorder 100 comprises a lens 110 which focuses an image onto a charge coupled device (CCD) image capture device 120. The resulting image in electronic form is processed by image processing logic 130 for recording on a recording medium such as a tape cassette 140. The images captured by the device 120 are also displayed on a user display 150 which may be viewed through an eyepiece 160.

To capture sounds associated with the images, one or more microphones are used. These may be external microphones, in the sense that they are connected to the camcorder by a flexible cable, or maybe mounted on the camcorder body itself. Analogue audio signals from the microphone (s) are processed by an audio processing arrangement 170 to produce appropriate audio signals for recording on the storage medium 140.

It is noted that the video and audio signals may be recorded on the storage medium 140 in either digital form or analogue form, or even in both forms. Thus, the image processing arrangement 130 and the audio processing arrangement 170 may include a stage of analogue to digital conversion.

The camcorder user is able to control aspects of the lens 110's performance by user controls 180 which influence a lens control arrangement 190 to send electrical control signals 200 to the lens 110. Typically, attributes such as focus and zoom are controlled in this way, but the lens aperture or other attributes may also be controlled by the user.

Two further user controls are schematically illustrated. A push button 210 is provided to initiate and stop recording onto the recording medium 140. For example, one push of the control 210 may start recording and another push may stop recording, or the control may need to be held in a pushed state for recording to take place, or one push may start recording for a certain timed period, for example five seconds. In any of these arrangements, it is technologically very straightforward to establish from the camcorder's record operation where the beginning and end of each "shot" (continuous period of recording) occurs.

The other user control shown schematically in FIG. 2 is a "good shot marker" (GSM) 220, which may be operated by the user to cause "metadata" (associated data) to be stored in connection with the video and audio material on the recording medium 140, indicating that this particular shot was subjectively considered by the operator to be "good" in some respect (for example, the actors performed particularly well; the news reporter pronounced each word correctly, and so on).

The metadata may be recorded in some spare capacity (e.g. "user data") on the recording medium 140, depending on the particular format and standard in use. Alternatively, the metadata can be stored on a separate storage medium such as a removable MemoryStick® memory (not shown), or the metadata could be stored on an external database (not shown), for example being communicated to such a database by a wireless link (not shown). The metadata can include, not only the GSM information but also shot boundaries, lens attributes, alphanumeric information input by a user (e.g. on a keyboard—not shown), geographical position information from a global positioning system receiver (not shown) and so on.

So far, the description has covered a metadata-enabled camcorder. Now, the way in which face detection may be applied to such a camcorder will be described.

The camcorder includes a face detector arrangement 230. Appropriate arrangements will be described in much greater detail below, but for this part of the description it is sufficient to say that the face detector arrangement 230 receives images from the image processing arrangement 130 and detects, or attempts to detect, whether such images contain one or more faces. The face detector may output face detection data which could be in the form of a "yes/no" flag or maybe more detailed in that the data could include the image co-ordinates of the faces, such as the co-ordinates of eye positions within each detected face. This information may be treated as another type of metadata and stored in any of the other formats described above.

As described below, face detection may be assisted by using other types of metadata within the detection process. For example, the face detector 230 receives a control signal from the lens control arrangement 190 to indicate the current focus and zoom settings of the lens 110. These can assist the face detector by giving an initial indication of the expected image size of any faces that may be present in the foreground of the image. In this regard, it is noted that the focus and zoom settings between them define the expected separation between the camcorder 100 and a person being filmed, and also the magnification of the lens 110. From these two attributes, based upon an average face size, it is possible to calculate the expected size (in pixels) of a face in the resulting image data.

A conventional (known) speech detector 240 receives audio information from the audio processing arrangement 170 and detects the presence of speech in such audio information. The presence of speech may be an indicator that the likelihood of a face being present in the corresponding images is higher than if no speech is detected.

Finally, the GSM information 220 and shot information (from the control 210) are supplied to the face detector 230, to indicate shot boundaries and those shots considered to be most useful by the user.

Of course, if the camcorder is based upon the analogue recording technique, further analogue to digital converters (ADCs) may be required to handle the image and audio information.

Figure 3:
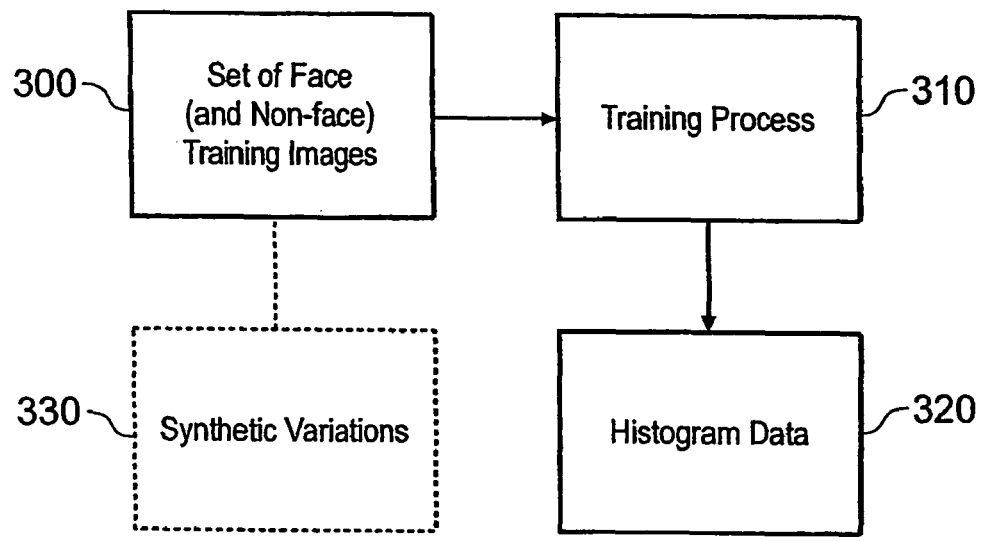
FIG. 3 is a schematic diagram illustrating a training process.
Figure 4:
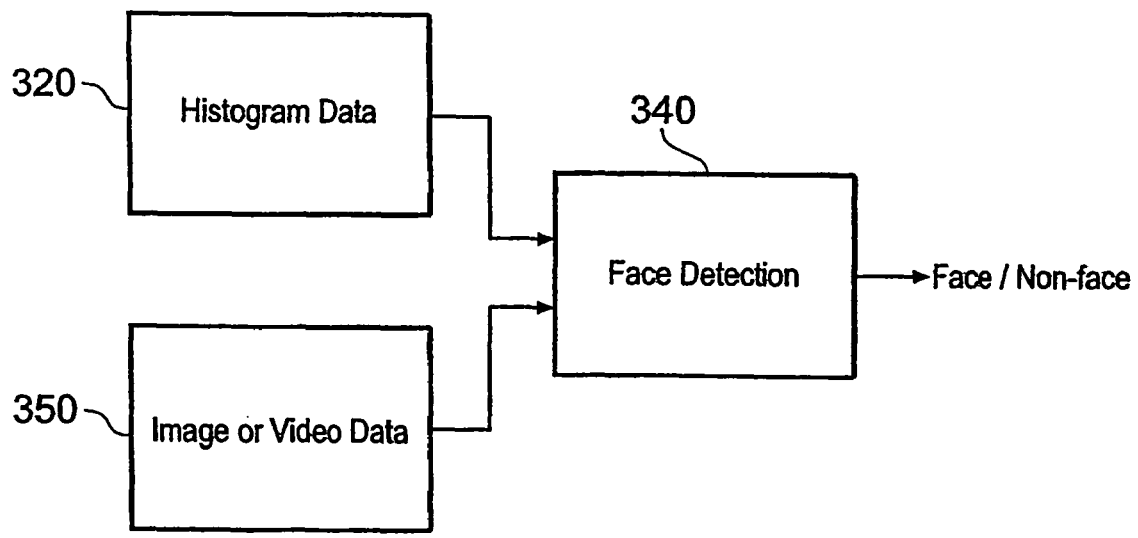
FIG. 4 is a schematic diagram illustrating a detection process.

The present embodiment uses a face detection technique arranged as two phases. FIG. 3 is a schematic diagram illustrating a training phase, and FIG. 4 is a schematic diagram illustrating a detection phase.

Unlike some previously proposed face detection methods (see References 4 and 5 below), the present method is based on modelling the face in parts-instead of as a whole. The parts can either be blocks centred over the assumed positions of the facial features (so-called "selective sampling") or blocks sampled at regular intervals over the face (so-called "regular sampling"). The present description will cover primarily regular sampling, as this was found in empirical tests to give the better results.

In the training phase, an analysis process is applied to a set of images known to contain faces, and (optionally) another set of images ("nonface images") known not to contain faces. The analysis process builds a mathematical model of facial and nonfacial features, against which a test image can later be compared (in the detection phase).

So, to build the mathematical model (the training process 310 of FIG. 3), the basic steps are as follows:

1. From a set 300 of face images normalised to have the same eye positions, each face is sampled regularly into small blocks.
2. Attributes are calculated for each block; these attributes are explained flirter below.
3. The attributes are quantised to a manageable number of different values.
4. The quantised attributes are then combined to generate a single quantised value in respect of that block position
5. The single quantised value is then recorded as an entry in a histogram, such as the schematic histogram of FIG. 5. The collective histogram information 320 in respect of all of the block positions in all of the training images forms the foundation of the mathematical model of the facial features.

One such histogram is prepared for each possible block position, by repeating the above steps in respect of a large number of test face images. The test data are described further in Appendix A below. So, in a system which uses an array of 8×8 blocks, 64 histograms are prepared. In a later part of the processing, a test quantised attribute is compared with the histogram data; the fact that a whole histogram is used to model the data means that no assumptions have to be made about whether it follows a parameterised distribution, e.g. Gaussian or otherwise. To save data storage space (if needed), histograms which are similar can be merged so that the same histogram can be reused for different block positions.

In the detection phase, to apply the face detector to a test image 350, successive windows in the test image are processed 340 as follows:
6. The window is sampled regularly as a series of blocks, and attributes in respect of each block are calculated and quantised as in stages 1-4 above.
7. Corresponding "probabilities" for the quantised attribute values for each block position are looked up from the corresponding histograms. That is to say, for each block position, a respective quantised attribute is generated and is compared with a histogram previously generated in respect of that block position. The way in which the histograms give rise to "probability" data will be described below.
8. All the probabilities obtained above are multiplied together to form a final probability which is compared against a threshold in order to classify the window as "face" or "nonface". It will be appreciated that the detection result of "face" or "nonface" is a probability-based measure rather than an absolute detection. Sometimes, an image not containing a face may be wrongly detected as "face", a so-called false positive. At other times, an image containing a face may be wrongly detected as "nonface", a so-called false negative. It is an aim of any face detection system to reduce the proportion of false positives and the proportion of false negatives, but it is of course understood that to reduce these proportions to zero is difficult, if not impossible, with current technology.

As mentioned above, in the training phase, a set of "nonface" images can be used to generate a corresponding set of "nonface" histograms. Then, to achieve detection of a face, the "probability" produced from the nonface histograms may be compared with a separate threshold, so that the probability has to be under the threshold for the test window to contain a face. Alternatively, the ratio of the face probability to the nonface probability could be compared with a threshold.

Extra training data may be generated by applying "synthetic variations" 330 to the original training set, such as variations in position, orientation, size, aspect ratio, background scenery, lighting intensity and frequency content.

The derivation of attributes and their quantisation will now be described. In the present technique, attributes are measured with respect to so called eigenblocks, which are core blocks (or eigenvectors) representing different types of block which may be present in the windowed image. The generation of eigenblocks will first be described with reference to FIG. 6.

Eigenblock Creation

The attributes in the present embodiment are based on so-called eigenblocks. The eigenblocks were designed to have good representational ability of the blocks in the training set. Therefore, they were created by performing principal component analysis on a large set of blocks from the training set. This process is shown schematically in FIG. 6 and described in more detail in Appendix B.

Training the System

Experiments were performed with two different sets of training blocks.

Eigenblock Set I

Initially, a set of blocks were used that were taken from 25 face images in the training set. The 16×16 blocks were sampled every 16 pixels and so were non-overlapping. This sampling is shown in FIG. 6. As can be seen, 16 blocks are generated from each 64×64 training image. This leads to a total of 400 training blocks overall.

The first 10 eigenblocks generated from these training blocks are shown in FIG. 7.

Eigenblock Set II

A second set of eigenblocks was generated from a much larger set of training blocks. These blocks were taken from 500 face images in the training set. In this case, the 16×16 blocks were sampled every 8 pixels and so overlapped by 8 pixels. This generated 49 blocks from each 64×64 training image and led to a total of 24,500 training blocks.

The first 12 eigenblocks generated from these training blocks are shown in FIG. 8.

Empirical results show that eigenblock set II gives slightly better results than set I. This is because it is calculated from a larger set of training blocks taken from face images, and so is perceived to be better at representing the variations in faces. However, the improvement in performance is not large.

Building the Histograms

A histogram was built for each sampled block position within the 64×64 face image. The number of histograms depends on the block spacing. For example, for block spacing of 16 pixels, there are 16 possible block positions and thus 16 histograms are used.

The process used to build a histogram representing a single block position is shown in FIG. 9. The histograms are created using a large training set 400 of M face images. For each face image, the process comprises:

Extracting 410 the relevant block from a position (i,j) in the face image.

Calculating the eigenblock-based attributes for the block, and determining the relevant bin number 420 from these attributes.

Incrementing the relevant bin number in the histogram 430.

This process is repeated for each of M images in the training set, to create a histogram that gives a good representation of the distribution of frequency of occurrence of the attributes. Ideally, M is very large, e.g. several thousand. This can more easily be achieved by using a training set made up of a set of original faces and several hundred synthetic variations of each original face.

Generating the Histogram Bin Number

A histogram bin number is generated from a given block using the following process, as shown in FIG. 10. The 16×16 block 440 is extracted from the 64×64 window or face image. The block is projected onto the set 450 of A eigenblocks to generate a set of "eigenblock weights". These eigenblock weights are the "attributes" used in this implementation. They have a range of −1 to +1. This process is described in more detail in Appendix B. Each weight is quantised into a fixed number of levels, L, to produce a set of quantised attributes 470, $w_i$, i=1 . . . A. The quantised weights are combined into a single value as follows:

$$h = w_1 L^{A-1} + w_2 L^{A-2} + w_3 L^{A-3} + \ldots + w_{A-1} L^1 + w_A L^0$$

where the value generated, h, is the histogram bin number 480. Note that the total number of bins the histogram is given by $L^A$.

The bin "contents", i.e. the frequency of occurrence of the set of attributes giving rise to that bin number, may be considered to be a probability value if it is divided by the number of training images M. However, because the probabilities are compared with a threshold, there is in fact no need to divide through by M as this value would cancel out in the calculations. So, in the following discussions, the bin "contents" will be referred to as "probability values", and treated as though they are probability values, even though in a strict sense they are in fact frequencies of occurrence.

The above process is used both in the training phase and in the detection-phase.

Face Detection Phase

The face detection process involves sampling the test image with a moving 64×64 window and calculating a face probability at each window-position.

The calculation of the face probability is shown in FIG. 11. For each block position in the window, the block's bin number 490 is calculated as described in the previous section. Using the appropriate histogram 500 for the position of the block, each bin number is looked up and the probability 510 of that bin number is determined. The sum 520 of the logs of these probabilities is then calculated across all the blocks to generate a face probability value, $P_{face}$ (otherwise referred to as a log likelihood value).

This process generates a probability "map" for the entire test image. In other words, a probability value is derived in respect of each possible window centre position across the image. The combination of all of these probability values into a rectangular (or whatever) shaped array is then considered to be a probability "map" corresponding to that image.

This map is then inverted, so that the process of finding a face involves finding minima in the inverted map. A so-called distance-based technique is used. This technique can be summarised as follows: The map (pixel) position with the smallest value in the inverted probability map is chosen. If this value is larger than a threshold (ID), no more faces are chosen. This is the termination criterion. Otherwise a face-sized block corresponding to the chosen centre pixel position is blanked out (i.e. omitted from the following calculations) and the candidate face position finding procedure is repeated on the rest of the image until the termination criterion is reached.

Nonface Method

The nonface model comprises an additional set of histograms which represent the probability distribution of attributes in nonface images. The histograms are created in exactly the same way as for the face model, except that the training images contain examples of nonfaces instead of faces.

During detection, two log probability values are computed, one using the face model and one using the nonface model. These are then combined by simply subtracting the nonface probability from the face probability:

$$P_{combined} = P_{face} - P_{nonface}$$

$P_{combined}$ is then used instead of $P_{face}$ to produce the probability map (before inversion).

Note that the reason that $P_{nonface}$ is subtracted from $P_{face}$ is because these are log probability values.

Histogram Examples

FIGS. 12a to 12f show some examples of histograms generated by the training process described above.

Figure 12A:
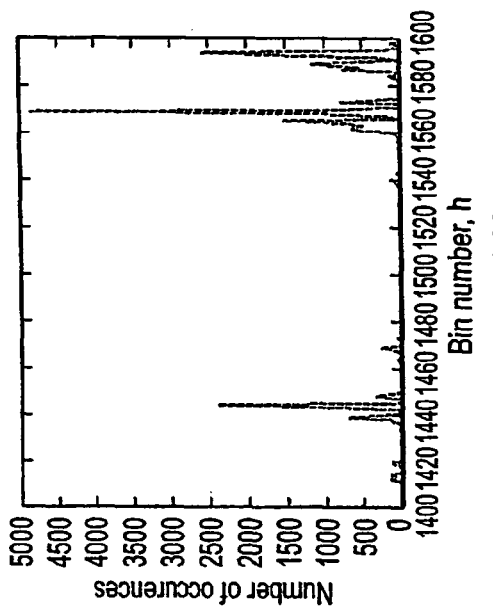
Figure 12B:
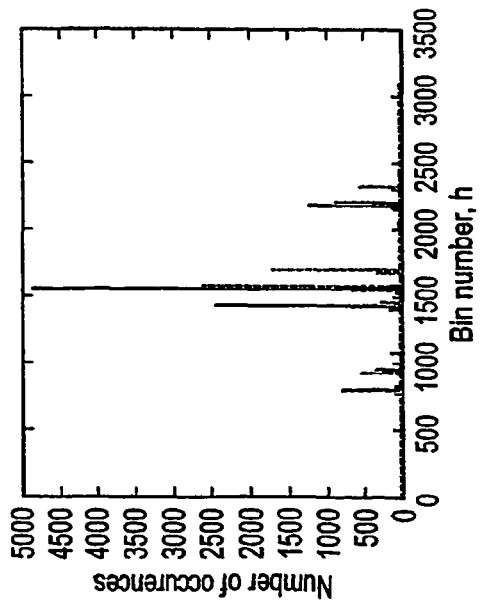
Figure 12C:
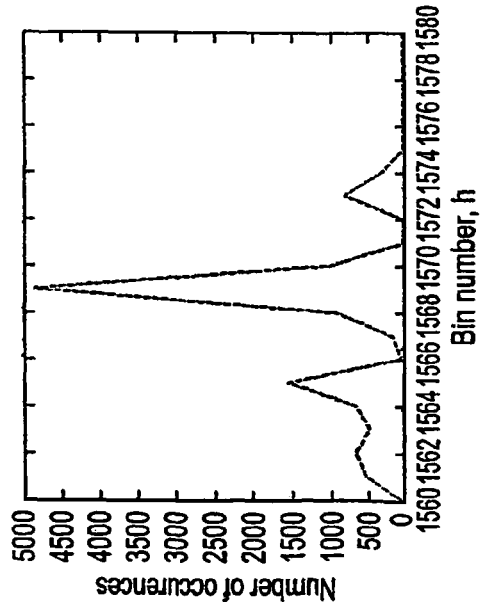
Figure 12E:
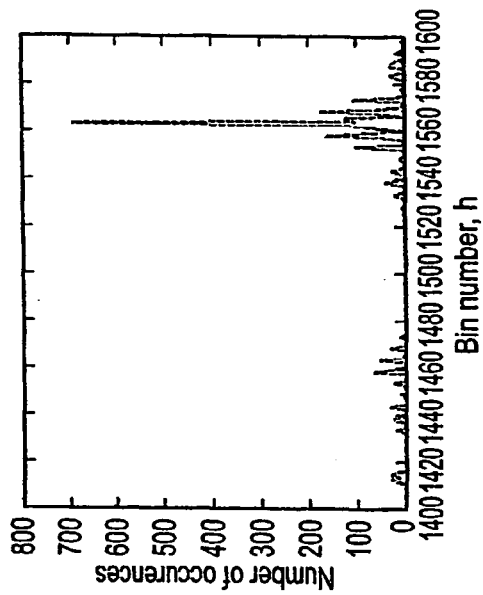
Figure 12D:
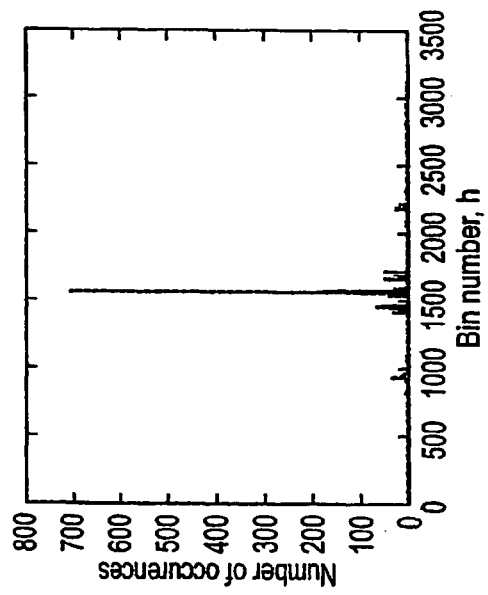
Figure 12F:
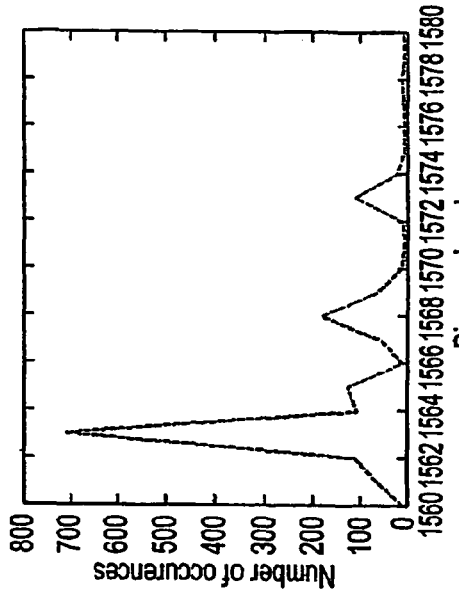

FIGS. 12a, 12b and 12c are derived from a training set of face images, and FIGS. 12d, 12e and 12f are derived from a training set of nonface images. In particular:

|  | Face histograms | Nonface histograms |
|---|---|---|
| Whole histogram | FIG. 12a | FIG. 12d |
| Zoomed onto the main peaks at about h = 1500 | FIG. 12b | FIG. 12e |
| A further zoom onto the region about h = 1570 | FIG. 12c | FIG. 12f |

It can clearly be seen that the peaks are in different places in the face histogram and the nonface histograms.

Multiscale Face Detection

Figures 13A, 13B, 13C:
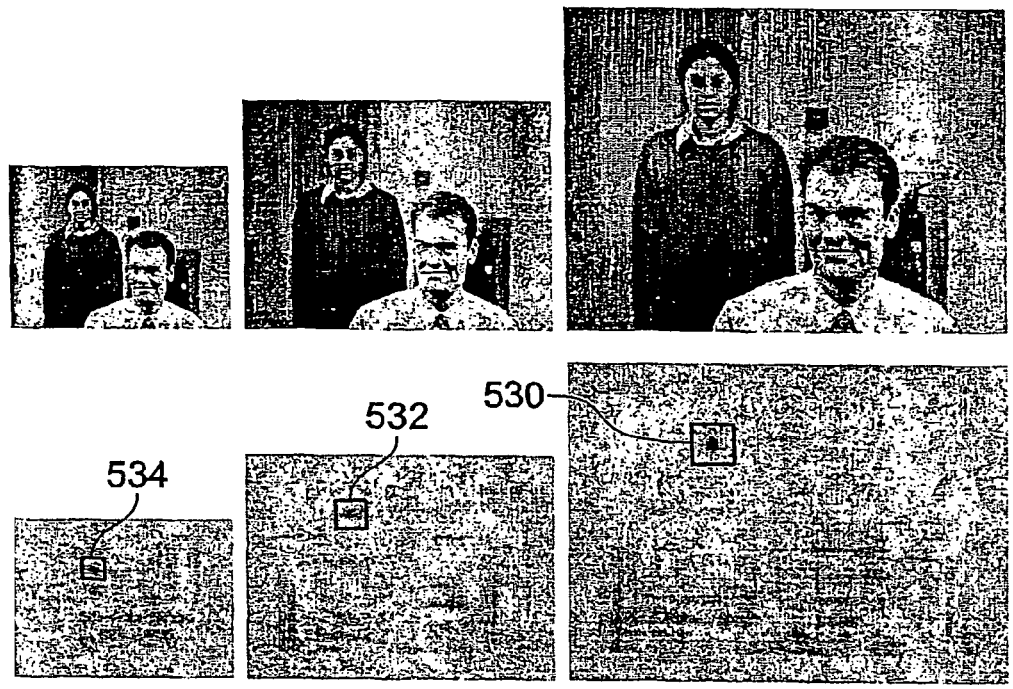
Figure 13D:
Figure 13E:
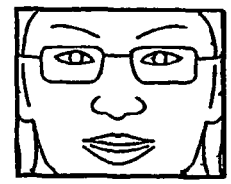
Figure 13F:
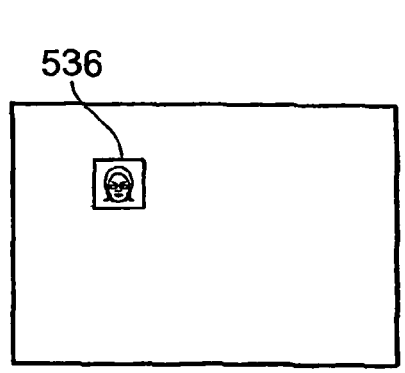
Figure 13G:
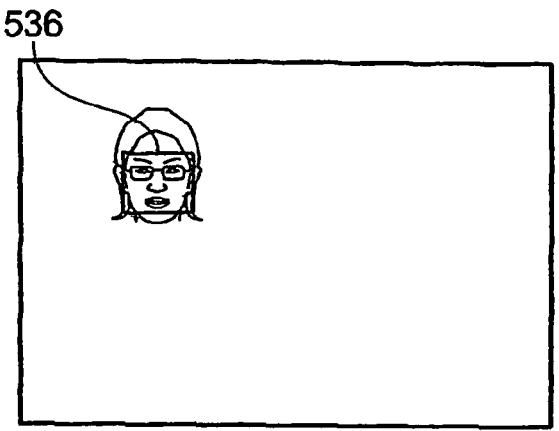

In order to detect faces of different sizes in the test image, the test image is scaled by a range of factors and a distance (i.e. probability) map is produced for each scale. In FIGS. 13a to 13c the images and their corresponding distance maps are shown at three different scales. The method gives the best response (highest probability, or minimum distance) for the large (central) subject at the smallest scale (FIG. 13a) and better responses for the smaller subject (to the left of the main figure) at the larger scales. (A darker colour on the map represents a lower value in the inverted map, or in other words a higher probability of there being a face). Candidate face positions are extracted across different scales by first finding the position which gives the best response over all scales. That is to say, the highest probability (lowest distance) is established amongst all of the probability maps at all of the scales. This candidate position is the first to be labelled as a face. The window centred over that face position is then blanked out from the probability-map at each scale. The size of the window blanked out is proportional to the scale of the probability map.

Examples of this scaled blanking-out process are shown in FIGS. 13a to 13c. In particular, the highest probability across all the maps is found at the left hand side of the largest scale map (FIG. 13c). An area 530 corresponding to the presumed size of a face is blanked off in FIG. 13c. Corresponding, but scaled, areas 532, 534 are blanked off in the smaller maps.

Areas larger than the test window may be blanked off in the maps, to avoid overlapping detections. In particular, an area equal to the size of the test window surrounded by a border half as wide/long as the test window is appropriate to avoid such overlapping detections.

Additional faces are detected by searching for the next best response and blanking out the corresponding windows successively.

The intervals allowed between the scales processed are influenced by the sensitivity of the method to variations in size. It was found in this preliminary study of scale invariance that the method is not excessively sensitive to variations in size as faces which gave a good response at a certain scale often gave a good response at adjacent scales as well.

The above description refers to detecting a face even though the size of the face in the image is not known at the start of the detection process. Another aspect of multiple scale face detection is the use of two or more parallel detections at different scales to validate the detection process. This can have advantages if, for example, the face to be detected is partially obscured, or the person is wearing a hat etc.

FIGS. 13d to 13g schematically illustrate this process. During the training phase, the system is trained on windows (divided into respective blocks as described above) which surround the whole of the test face (FIG. 13d) to generate "full face" histogram data and also on windows at an expanded scale so that only a central area of the test face is included (FIG. 13e) to generate "zoomed in" histogram data. This generates two sets of histogram data. One set relates to the "full face" windows of FIG. 13d, and the other relates to the "central face area" windows of FIG. 13e.

During the detection phase, for any given test window 536, the window is applied to two different scalings of the test image so that in one (FIG. 13f) the test window surrounds the whole of the expected size of a face, and in the other (FIG. 13g) the test window encompasses the central area of a face at that expected size. These are each processed as described above, being compared with the respective sets of histogram data appropriate to the type of window. The log probabilities from each parallel process are added before the comparison with a threshold is applied.

Putting both of these aspects of multiple scale face detection together leads to a particularly elegant saving in the amount of data that needs to be stored.

In particular, in these embodiments the multiple scales for the arrangements of FIGS. 13a to 13c are arranged in a geometric sequence. In the present example, each scale in the sequence is a factor of {fourth root}√2 different to the adjacent scale in the sequence. Then, for the parallel detection described with reference to FIGS. 13d to 13g, the larger scale, central area, detection is carried out at a scale 3 steps higher in the sequence, that is, 2¾ times larger than the "full face" scale, using attribute data relating to the scale 3 steps higher in the sequence. So, apart from at extremes of the range of multiple scales, the geometric progression means that the parallel detection of FIGS. 13d to 13g can always be carried out using attribute data generated in respect of another multiple scale three steps higher in the sequence.

The two processes (multiple scale detection and parallel scale detection) can be combined in various ways. For example, the multiple scale detection process of FIGS. 13a to 13c can be applied first, and then the parallel scale detection process of FIGS. 13d to 13g can be applied at areas (and scales) identified during the multiple scale detection process. However, a convenient and efficient use of the attribute data may be achieved by:

deriving attributes in respect of the test window at each scale (as in FIGS. 13a to 13c)
comparing those attributes with the "full face" histogram data to generate a "full face" set of distance maps
comparing the attributes with the "zoomed in" histogram data to generate a "zoomed in" set of distance maps
for each scale n, combining the "full face" distance map for scale n with the "zoomed in" distance map for scale n+3
deriving face positions from the combined distance maps as described above with reference to FIGS. 13a to 13c Further parallel testing can be performed to detect different poses, such as looking straight ahead, looking partly up, down, left, right etc. Here a respective set of histogram data is required and the results are preferably combined using a "max" function, that is, the pose giving the highest probability is carried forward to thresholding, the others being discarded.

Face Tracking

A face tracking algorithm will now be described. The tracking algorithm aims to improve face detection performance in image sequences.

The initial aim of the tracking algorithm is to detect every face in every frame of an image sequence. However, it is recognised that sometimes a face in the sequence may not be detected. In these circumstances, the tracking algorithm may assist in interpolating across the missing face detections.

Ultimately, the goal of face tracking is to be able to output some useful metadata from each set of frames belonging to the same scene in an image sequence. This might include:

Number of faces.
"Mugshot" (a colloquial word for an image of a person's face, derived from a term referring to a police file photograph) of each face.
Frame number at which each face first appears.
Frame number at which each face last appears.
Identity of each face (either matched to faces seen in previous scenes, or matched to a face database)—this requires some face recognition also.

The tracking algorithm uses the results of the face detection algorithm, run independently on each frame of the image sequence, as its starting point. Because the face detection algorithm may sometimes miss (not detect) faces, some method of interpolating the missing faces is useful. To this end, a Kalman filter was used to predict the next position of the face and a skin colour matching algorithm was used to aid tracking of faces. In addition, because the face detection algorithm often gives rise to false acceptances, some method of rejecting these is also useful.

The algorithm is shown schematically in FIG. 14.

The algorithm will be described in detail below, but in summary, input video data 545 (representing the image sequence) is supplied to a face detector of the type described in this application, and a skin colour matching detector 550. The face detector attempts to detect one or more faces in each image. When a face is detected, a Kalman filter 560 is established to track the position of that face. The Kalman filter generates a predicted position for the same face in the next image in the sequence. An eye position comparator 570, 580 detects whether the face detector 540 detects a face at that position (or within a certain threshold distance of that position) in the next image. If this is found to be the case, then that detected face position is used to update the Kalman filter and the process continues.

If a face is not detected at or near the predicted position, then a skin colour matching method 550 is used. This is a less precise face detection technique which is set up to have a lower threshold of acceptance than the face detector 540, so that it is possible for the skin colour matching technique to detect (what it considers to be) a face even when the face detector cannot make a positive detection at that position. If a "face" is detected by skin colour matching, its position is passed to the Kalman filter as an updated position and the process continues.

If no match is found by either the face detector 450 or the skin colour detector 550, then the predicted position is used to update the Kalman filter.

All of these results are subject to acceptance criteria (see below). So, for example, a face that is tracked throughout a sequence on the basis of one positive detection and the remainder as predictions, or the remainder as skin colour detections, will be rejected.

A separate Kalman filter is used to track each face in the tracking algorithm.

In order to use a Kalman filter to track a face, a state model representing the face must be created. In the model, the position of each face is represented by a 4-dimensional vector containing the coordinates of the left and right eyes, which in turn are derived by a predetermined relationship to the centre position of the window and the scale being used:

$$p(k) = \begin{bmatrix} FirstEyeX \\ FirstEyeY \\ SecondEyeX \\ SecondEyeY \end{bmatrix}$$

where k is the frame number.

The current state of the face is represented by its position, velocity and acceleration, in a 12-dimensional vector:

$$\hat{z}(k) = \begin{bmatrix} p(k) \\ \dot{p}(k) \\ \ddot{p}(k) \end{bmatrix}$$

First Face Detected

The tracking algorithm does nothing until it receives a frame with a face detection result indicating that there is a face present.

A Kalman filter is then initialised for each detected face in this frame. Its state is initialised with the position of the face, and with zero velocity and acceleration:

$$\hat{z}_a(k) = \begin{bmatrix} p(k) \\ 0 \\ 0 \end{bmatrix}$$

It is also assigned some other attributes: the state model error covariance, Q and the observation error covariance, R. The error covariance of the Kalman filter, P, is also initialised. These parameters are described in more detail below. At the beginning of the following frame, and every subsequent frame, a Kalman filter prediction process is carried out.

Kalman Filter Prediction Process

For each existing Kalman filter, the next position of the face is predicted using the standard Kalman filter prediction equations shown below. The filter uses the previous state (at frame k−1) and some other internal and external variables to estimate the current state of the filter (at frame k).

State prediction equation: $\hat{z}_b(k) = \Phi(k,k-1)\hat{z}_a(k-1)$

Covariance prediction equation: $P_b(k) = \Phi(k,k-1)P_a(k-1)\Phi(k,k-1)^T + Q(k)$ where $\hat{z}_b(k)$ denotes the state before updating the filter for frame k, $\hat{z}_a(k-1)$ denotes the state after updating the filter for frame k−1 (or the initialised state if it is a new filter), and $\Phi(k,k-1)$ is the state transition matrix. Various state transition matrices were experimented with, as described below. Similarly, $P_b(k)$ denotes the filter's error covariance before updating the filter for frame k and $P_a(k-1)$ denotes the filter's error covariance after updating the filter for the previous frame (or the initialised value if it is a new filter). $P_b(k)$ can be thought of as an internal variable in the filter that models its accuracy.

Q(k) is the error covariance of the state model. A high value of Q(k) means that the predicted values of the filter's state (i.e. the face's position) will be assumed to have a high level of error. By tuning this parameter, the behaviour of the filter can be changed and potentially improved for face detection.

State Transition Matrix

The state transition matrix, $\Phi(k,k-1)$, determines how the prediction of the next state is made. Using the equations for motion, the following matrix can be derived for $\Phi(k,k-1)$:

$$\Phi(k, k-1) = \begin{bmatrix} I_4 & I_4\Delta t & \frac{1}{2}I_4(\Delta t)^2 \\ O_4 & I_4 & I_4\Delta t \\ O_4 & O_4 & I_4 \end{bmatrix}$$

where $O_4$ is a 4×4 zero matrix and $I_4$ is a 4×4 identity matrix. $\Delta t$ can simply be set to 1 (i.e. units of t are frame periods).

This state transition matrix models position, velocity and acceleration. However, it was found that the use of acceleration tended to make the face predictions accelerate towards the edge of the picture when no face detections were available to correct the predicted state. Therefore, a simpler state transition matrix without using acceleration was preferred:

$$\Phi(k, k-1) = \begin{bmatrix} I_4 & I_4\Delta t & O_4 \\ O_4 & I_4 & O_4 \\ O_4 & O_4 & O_4 \end{bmatrix}$$

The predicted eye positions of each Kalman filter, $\hat{z}_b(k)$, are compared to all face detection results in the current frame (if there are any). If the distance between the eye positions is below a given threshold, then the face detection can be assumed to belong to the same face as that being modelled by the Kalman filter. The face detection result is then treated as an observation, y(k), of the face's current state:

$$y(k) = \begin{bmatrix} p(k) \\ 0 \\ 0 \end{bmatrix}$$

where p(k) is the position of the eyes in the face detection result. This observation is used during the Kalman filter update stage to help correct the prediction.

Skin Colour Matching

Skin colour matching is not used for faces that successfully match face detection results. Skin colour matching is only performed for faces whose position has been predicted by the Kalman filter but have no matching face detection result in the current frame, and therefore no observation data to help update the Kalman filter.

In a fist technique, for each face, an elliptical area centred on the face's previous position is extracted from the previous frame. An example of such an area 600 within the face window 610 is shown schematically in FIG. 16. A colour model is seeded using the chrominance data from this area to produce an estimate of the mean and covariance of the Cr and Cb values, based on a Gaussian model.

An area around the predicted face position in the current frame is then searched and the position that best matches the colour model, again averaged over an elliptical area, is selected. If the colour match meets a given similarity criterion, then this position is used as an observation, y(k), of the face's current state in the same way described for face detection results in the previous section.

FIGS. 15a and 15b schematically illustrate the generation of the search area. In particular, FIG. 15a schematically illustrates the predicted position 620 of a face within the next image 630. In skin colour matching, a search area 640 surrounding the predicted position 620 in the next image is searched for the face.

If the colour match does not meet the similarity criterion, then no reliable observation data is available for the current frame. Instead, the predicted state, $\hat{z}_b(k)$ is used as the observation:

$$y(k)=\hat{z}_b(k)$$

The skin colour matching methods described above use a simple Gaussian skin colour model. The model is seeded on an elliptical area centred on the face in the previous frame, and used to find the best matching elliptical area in the current frame. However, to provide a potentially better performance, two further methods were developed: a colour histogram method and a colour mask method. These will now be described.

Colour Histogram Method

In this method, instead of using a Gaussian to model the distribution of colour in the tracked face, a colour histogram is used.

For each tracked face in the previous frame, a histogram of Cr and Cb values within a square window around the face is computed. To do this, for each pixel the Cr and Cb values are first combined into a single value. A histogram is then computed that measures the frequency of occurrence of these values in the whole window. Because the number of combined Cr and Cb values is large (256×256 possible combinations), the values are quantised before the histogram is calculated.

Having calculated a histogram for a tracked face in the previous frame, the histogram is used in the current fame to try to estimate the most likely new position of the face by finding the area of the image with the most similar colour distribution. As shown schematically in FIGS. 15a and 15b, this is done by calculating a histogram in exactly the same way for a range of window positions within a search area of the current frame. This search area covers a given area around the predicted face position. The histograms are then compared by calculating the mean squared error (MSE) between the original histogram for the tracked face in the previous frame and each histogram in the current frame. The estimated position of the face in the current frame is given by the position of the minimum MSE.

Various modifications may be made to this algorithm, including:

Using three channels (Y, Cr and Cb) instead of two (Cr, Cb).

Varying the number of quantisation levels.

Dividing the window into blocks and calculating a histogram for each block. In this way, the colour histogram method becomes positionally dependent. The MSE between each pair of histograms is summed in this method.

Varying the number of blocks into which the window is divided.

Varying the blocks that are actually used—e.g. omitting the outer blocks which might only partially contain face pixels.

For the test data used in empirical trials of these techniques, the best results were achieved using the following conditions, although other sets of conditions may provide equally good or better results with different test data:

3 channels (Y, Cr and Cb).

8 quantisation levels for each channel (i.e. histogram contains 8×8×8=512 bins).

Dividing the windows into 16 blocks.

Using all 16 blocks.

Colour Mask Method

This method is based on the method first described above. It uses a Gaussian skin colour model to describe the distribution of pixels in the face.

In the method first described above, an elliptical area centred on the face is used to colour match faces, as this may be perceived to reduce or minimise the quantity of background pixels which might degrade the model.

In the present colour mask model, a similar elliptical area is still used to seed a colour model on the original tracked face in the previous frame, for example by applying the mean and covariance of RGB or YCrCb to set parameters of a Gaussian model (or alternatively, a default colour model such as a Gaussian model can be used, see below). However, it is not used when searching for the best match in the current frame. Instead, a mask area is calculated based on the distribution of pixels in the original face window from the previous frame. The mask is calculated by finding the 50% of pixels in the window which best match the colour model. An example is shown in FIGS. 17a to 17c. In particular, FIG. 17a schematically illustrates the initial window under test; FIG. 17b schematically illustrates the elliptical window used to seed the colour model; and FIG. 17c schematically illustrates the mask defined by the 50% of pixels which most closely match the colour model.

To estimate the position of the face in the current frame, a search area around the predicted face position is searched (as before) and the "distance" from the colour model is calculated for each pixel. The "distance" refers to a difference from the mean, normalised in each dimension by the variance in that dimension. An example of the resultant distance image is shown in FIG. 18. For each position in this distance map (or for a reduced set of sampled positions to reduce computation time), the pixels of the distance image are averaged over a mask-shaped area. The position with the lowest averaged distance is then selected as the best estimate for the position of the face in this frame.

This method thus differs from the original method in that a mask-shaped area is used in the distance image, instead of an elliptical area. This allows the colour match method to use both colour and shape information.

Two variations are proposed and were implemented in empirical trials of the techniques:

(a) Gaussian skin colour model is seeded using the mean and covariance of Cr and Cb from an elliptical area centred on the tracked face in the previous frame.

(b) A default Gaussian skin colour model is used, both to calculate the mask in the previous frame and calculate the distance image in the current frame.

The use of Gaussian skin colour models will now be described further. A Gaussian model for the skin colour class is built using the chrominance components of the YCbCr colour space. The similarity of test pixels to the skin colour class can then be measured. This method thus provides a skin colour likelihood estimate for each pixel, independently of the eigenface-based approaches.

Let w be the vector of the CbCr values of a test pixel. The probability of w belonging to the skin colour class S is modelled by a two-dimensional Gaussian:

$$p(w|S) = \frac{\exp\left[-\frac{1}{2}(w-\mu_s)\sum_{s}^{-1}(w-\mu_s)\right]}{2\pi|\sum_{s}|^{\frac{1}{2}}}$$

where the mean $\mu_s$ and the covariance matrix $\Sigma_s$ of the distribution are (previously) estimated from a training set of skin colour values.

Skin colour detection is not considered to be an effective face detector when used on its own. This is because there can be many areas of an image that are similar to skin colour but are not necessarily faces, for example other parts of the body. However, it can be used to improve the performance of the eigenblock-based approaches by using a combined approach as described in respect of the present face tracking system. The decisions made on whether to accept the face detected eye positions or the colour matched eye positions as the observation for the Kalman filter, or whether no observation was accepted, are stored. These are used later to assess the ongoing validity of the faces modelled by each Kalman filter.

Kalman Filter Update Step

The update step is used to determine an appropriate output of the filter for the current frame, based on the state prediction and the observation data. It also updates the internal variables of the filter based on the error between the predicted state and the observed state.

The following equations are used in the update step:

Kalman gain equation $K(k) = P_b(k)H^T(k)(H(k)P_b(k)H^T(k)+R(k))^{-1}$

State update equation $\hat{z}_a(k) = \hat{z}_b(k)+K(k)[y(k)-H(k)\hat{z}_b(k)\hat{z}_b(k)]$ Covariance update equation $P_a(k) = P_b(k)-K(k)H(k)P_b(k)$ Here, K(k) denotes the Kalman gain, another variable internal to the Kalman filter. It is used to determine how much the predicted state should be adjusted based on the observed state, y(k).

H(k) is the observation matrix. It determines which parts of the state can be observed. In our case, only the position of the face can be observed, not its velocity or acceleration, so the following matrix is used for H(k):

$$H(k) = \begin{bmatrix} I_4 & O_4 & O_4 \\ O_4 & O_4 & O_4 \\ O_4 & O_4 & O_4 \end{bmatrix}$$

R(k) is the error covariance of the observation data. In a similar way to Q(k); a high value of R(k) means that the observed values of the filter's state (i.e. the face detection results or colour matches) will be assumed to have a high level of error. By tuning this parameter, the behaviour of the filter can be changed and potentially improved for face detection. For our experiments, a large value of R(k) relative to Q(k) was found to be suitable (this means that the predicted face positions are treated as more reliable than the observations). Note that it is permissible to vary these parameters from frame to frame. Therefore, an interesting future area of investigation may be to adjust the relative values of R(k) and Q(k) depending on whether the observation is based on a face detection result (reliable) or a colour match (less reliable).

For each Kalman filter, the updated state, $\hat{z}_a(k)$, is used as the final decision on the position of the face. This data is output to file and stored.

Unmatched face detection results are treated as new faces. A new Kalman filter is initialised for each of these. Faces are removed which:

Leave the edge of the picture and/or

Have a lack of ongoing evidence supporting them (when there is a high proportion of observations based on Kalman filter predictions rather than face detection results or colour matches).

For these faces, the associated Kalman filter is removed and no data is output to file. As an optional difference from this approach, where a face is detected to leave the picture, the tracking results up to the frame before it leaves the picture may be stored and treated as valid face tracking results (providing that the results meet any other criteria applied to validate tracking results).

These rules may be formalised and built upon by bringing in some additional variables:

| | |
|---|---|
| prediction_acceptance_ratio_threshold | If, during tracking a given face, the proportion of accepted Kalman predicted face positions exceeds this threshold, then the tracked face is rejected. This is currently set to 0.8. |
| detection_acceptance_ratio_threshold | During a final pass through all the frames, if for a given face the proportion of accepted face detections falls below this threshold, then the tracked face is rejected. This is currently set to 0.08. |
| min_frames | During a final pass through all the frames, if for a given face the numbers of occurrences is less than min_frames, the face is rejected. This is only likely to occur near the end of a sequence. min_frames is currently set to 5. |
| final_prediction_acceptance_ratio_threshold and min_frames2 | During a final pass through all the frames, if for a given tracked face the number of occurrences is less than min_frames2 AND the proportion of accepted Kalman predicted face positions exceeds the final_prediction_acceptance_ratio_threshold, the face is rejected. Again, this is only likely to occur near the end of a sequence. final_prediction_acceptance_ratio_threshold is currently set to 0.5 and min_frames2 is currently set to 10. |

| | | |
|---|---|---|
| min_eye_spacing | | Additionally, faces are now removed if they are tracked such that the eye spacing is decreased below a given minimum distance. This can happen if the Kalman filter falsely believes the eye distance is becoming smaller and there is no other evidence, e.g. face detection results, to correct this assumption. If uncorrected, the eye distance would eventually become zero. As an optional alternative, a minimum or lower limit eye separation can be forced, so that if the detected eye separation reduces to the minimum eye separation, the detection process continues to search for faces having that eye separation, but not a smaller eye separation. |

It is noted that the tracking process is not limited to tracking through a video sequence in a forward temporal direction. Assuming that the image data remain accessible (i.e. the process is not real-time, or the image data are buffered for temporary continued use), the entire tracking process could be carried out in a reverse temporal direction. Or, when a first face detection is made (often part-way through a video sequence) the tracking process could be initiated in both temporal directions. As a further option, the tracking process could be run in both temporal directions through a video sequence, with the results being combined so that (for example) a tracked face meeting the acceptance criteria is included as a valid result whichever direction the tracking took place.

Overlap Rules for Face Tracking

When the faces are tracked, it is possible for the face tracks to become overlapped. When this happens, in at least some applications, one of the tracks should be deleted. A set of rules is used to determine which face track should persist in the event of an overlap.

Whilst the faces are being tracked there are 3 possible types of track:
D: Face Detection—the current position of the face is confirmed by a new face detection
S: Skin colour track—there is no face detection, but a suitable skin colour track has been found
P: Prediction—there is neither a suitable face detection nor skin colour track, so the predicted face position from the Kalman filter is used.

The following grid defines a priority order if two face tracks overlap with each other:

| | Face 2 | | |
|---|---|---|---|
| Face 1 | D | S | P |
| D | Largest Face Size | D | D |
| S | D | Largest Face Size | S |
| P | D | S | Largest Face Size |

So, if both tracks are of the same type, then the largest face size determines which track is to be maintained. Otherwise, detected tracks have priority over skin colour or predicted tracks. Skin colour tracks have priority over predicted tracks.

In the tracking method described above, a face track is started for every face detection that cannot be matched up with an existing track. This could lead to many false detections being erroneously tracked and persisting for several frames before finally being rejected by one of the existing rules (e.g. by the rule associated with the prediction_acceptance_ratio_threshold).

Also, the existing rules for rejecting a track (e.g. those rules relating to the variables prediction_acceptance_ratio_threshold and detection_acceptance_ratio_threshold), are biased against tracking someone who turns their head to the side for a significant length of time. In reality, it is often desirable to carry on tracking someone who does this.

A solution will now be described.

The first part of the solution helps to prevent false detections from setting off erroneous tracks. A face track is still started internally for every face detection that does not match an existing track. However, it is not output from the algorithm. In order for this track to be maintained, the first f frames in the track must be face detections (i.e. of type D). If all of the first f frames are of type D then the track is maintained and face locations are output from the algorithm from frame f onwards.

If all of the first n frames are not of type D, then the face track is terminated and no face locations are output for this track.

f is typically set to 2, 3 or 5.

The second part of the solution allows faces in profile to be tracked for a long period, rather than having their tracks terminated due to a low detection_acceptance_ratio. To achieve this, where the faces are matched by the ±30° eigenblocks, the tests relating to the variables prediction_acceptance_ratio_threshold and detection_acceptance_ratio_threshold are not used. Instead, an option is to include the following criterion to maintain a face track:

g consecutive face detections are required every n frames to maintain the face track where g is typically set to a similar value t of, e.g. 1-5 frames and n corresponds to the maximum number of frames for which we wish to be able to track someone when they are turned away from the camera, e.g. 10 seconds (=250 or 300 frames depending on frame rate).

This may also be combined with the prediction_acceptance_ratio_threshold and detection_acceptance_ratio_threshold rules. Alternatively, the prediction_acceptance_ratio_threshold and detection_acceptance_ratio_threshold may be applied on a rolling basis e.g. over only the last 30 frames, rather than since the beginning of the track.

Another criterion for rejecting a face track is that a so-called "bad colour threshold" is exceeded. In this test a tracked face position is validated by skin colour (whatever the acceptance type—face detection or Kalman prediction). Any face whose distance from an expected skin colour exceeds a given "bad colour threshold" has its track terminated.

In the method described above, the skin colour of the face is only checked during skin colour tracking. This means that non-skin-coloured false detections may be tracked, or the face track may wander off into non-skin-coloured locations by using the predicted face position.

To improve on this, whatever the acceptance type of the face (detection, skin colour or Kalman prediction), its skin colour is checked. If its distance (difference) from skin colour exceeds, a bad_colour_threshold, then the face track is terminated.

An efficient way to implement this is to use the distance from skin colour of each pixel calculated during skin colour tracking. If this measure, averaged over the face area (either over a mask shaped area, over an elliptical area or over the whole face window depending on which skin colour tracking method is being used), exceeds a fixed threshold, then the face track is terminated.

A further criterion for rejecting a face track is that its variance is very low or very high. This technique will be described below after the description of FIGS. 22a to 22c.

In the tracking system shown schematically in FIG. 14, three further features are included.

Shot boundary data 560 (from metadata associated with the image sequence under test; or metadata generated within the camera of FIG. 2) defines the limits of each contiguous "shot" within the image sequence. The Kalman filter is reset at shot boundaries, and is not allowed to carry a prediction over to a subsequent shot, as the prediction would be meaningless.

User metadata 542 and camera setting metadata 544 are supplied as inputs to the face detector 540. These may also be used in a non-tracking system. Examples of the camera setting metadata were described above. User metadata may include information such as:

- type of programme (e.g. news, interview, drama)
- script information such as specification of a "long shot", "medium close-up" etc particular types of camera shot leading to an expected sub-range of face sizes), how many people involved in each shot (again leading to an expected sub-range of face sizes) and so on
- sports-related information—sports are often filmed from fixed camera positions using standard views and shots. By specifying these in the metadata, again a sub-range of face sizes can be derived.

The type of programme is relevant to the type of face which may be expected in the images or image sequence. For example, in a news programme, one would expect to see a single face for much of the image sequence, occupying an area of (say) 10% of the screen. The detection of faces at different scales can be weighted in response to this data, so that faces of about this size are given an enhanced probability. Another alternative or additional approach is that the search range is reduced, so that instead of searching for faces at all possible scales, only a subset of scales is searched. This can reduce the processing requirements of the face detection process. In a software-based system, the software can run more quickly and/or on a less powerful processor. In a hardware-based system (including for example an application-specific integrated circuit (ASIC) or field programmable gate array (FPGA) system) the hardware needs may be reduced.

The other types of user metadata mentioned above may also be applied in this way. The "expected face size" sub-ranges may be stored in a look-up table held in the memory 30, for example.

As regards camera metadata, for example the current focus and zoom settings of the lens 110, these can also assist the face detector by giving an initial indication of the expected image size of any faces that may be present in the foreground of the image. In this regard, it is noted that the focus and zoom settings between them define the expected separation between the camcorder 100 and a person being filmed, and also the magnification of the lens 110. From these two attributes, based upon an average face size, it is possible to calculate the expected size (in pixels) of a face in the resulting image data, leading again to a sub-range of sizes for search or a weighting of the expected face sizes.

This arrangement lends itself to use in a video conferencing or so-called digital signage environment.

In a video conferencing arrangement the user could classify the video material as "individual speaker", "Group of two", "Group of three" etc, and based on this classification a face detector could derive an expected face size and could search for and highlight the one or more faces in the image.

In a digital signage environment, advertising material could be displayed on a video screen. Face detection is used to detect the faces of people looking at the advertising material.

Advantages of the Tracking Algorithm

The face tracking technique has three main benefits:

It allows missed faces to be filled in by using Kalman filtering and skin colour tracking in frames for which no face detection results are available. This increases the true acceptance rate across the image sequence.

It provides face inking: by successfully tracking a face, the algorithm automatically knows whether a face detected in a future frame belongs to the same person or a different person. Thus, scene metadata can easily be generated from this algorithm, comprising the number of faces in the scene, the frames for which they are present and providing a representative mugshot of each face.

False face detections tend to be rejected, as such detections tend not to carry forward between images.

FIGS. 19a to 19c schematically illustrate the use of face tracking when applied to a video scene.

In particular, FIG. 19a schematically illustrates a video scene 800 comprising successive video images (e.g. fields or frames) 810.

In this example, the images 810 contain one or more faces. In particular all of the images 810 in the scene include a face A, shown at an upper left-hand position within the schematic representation of the image 810. Also, some of the images include a face B shown schematically at a lower right hand position within the schematic representations of the images 810.

A face tracking process is applied to the scene of FIG. 19a. Face A is tracked reasonably successfully throughout the scene. In one image 820 the face is not tracked by a direct detection, but the skin colour matching techniques and the Kalman filtering techniques described above mean that the detection can be continuous either side of the "missing" image 820. The representation of FIG. 19b indicates the detected probability of a face being present in each of the images. It can be seen that the probability is highest at an image 830, and so the part 840 of the image detected to contain face A is used as a "picture stamp" in respect of face A. Picture stamps will be described in more detail below.

Similarly, face B is detected with different levels of confidence, but an image 850 gives rise to the highest detected probability of face B being present. Accordingly, the part of the corresponding image detected to contain face B (part 860) is used as a picture stamp for face B within that scene. (Alternatively, of course, a wider section of the image, or even the whole image, could be used as the picture stop).

For each tracked face, a single representative face picture stamp is required. Outputting the face picture stamp based purely on face probability does not always give the best quality of picture stamp. To get the best picture quality it would be better to bias or steer the selection decision towards faces that are detected at the same resolution as the picture stamp, e.g. 64×64 pixels To get the best quality picture stamps the following scheme may be applied:

(1) Use a face that was detected (not colour tracked/Kalman tracked)

(2) Use a face that gave a high probability during face detection, i.e. at least a threshold probability.

(3) Use a face which is as close as possible to 64×64 pixels, to reduce rescaling artefacts and improve picture quality (4) Do not (if possible) use a very early face in the track, i.e. a face in a predetermined initial portion of the tracked sequence (e.g. 10% of the tracked sequence, or 20 frames, etc) in case this means that the face is still very distant (i.e. small) and blurry Some rules that could achieve this are as follows:
For each face detection:

Calculate the metric M=face_probability*
size_weighting, where size_weighting=
MIN((face_size/64)^x, (64/face_size)^x) and
x=0.25. Then take the face picture stamp for
which M is largest.

This gives the following weightings on the face probability for each face size:

| face_size | size_weighting |
|---|---|
| 16 | 0.71 |
| 19 | 0.74 |
| 23 | 0.77 |
| 27 | 0.81 |
| 32 | 0.84 |
| 38 | 0.88 |
| 45 | 0.92 |
| 54 | 0.96 |
| 64 | 1.00 |
| 76 | 0.96 |
| 91 | 0.92 |
| 108 | 0.88 |
| 128 | 0.84 |
| 152 | 0.81 |
| 181 | 0.77 |
| 215 | 0.74 |
| 256 | 0.71 |
| 304 | 0.68 |
| 362 | 0.65 |
| 431 | 0.62 |
| 512 | 0.59 |

In practice this could be done using a look-up table.

To make the weighting function less harsh, a smaller power than 0.25, e.g. x=0.2 or 0.1, could be used.

This weighting technique could be applied to the whole face track or just to the first N frames (to apply a weighting against the selection of a poorly-sized face from those N frames). N could for example represent just the first one or two seconds (25-50 frames).

In addition, preference is given to faces that are frontally detected over those that were detected at +−30 degrees (or any other pose).

FIG. 20 schematically illustrates a display screen of a non-linear editing system.

Non-linear editing systems are well established and are generally implemented as software programs running on general purpose computing systems such as the system of FIG. 1. These editing systems allow video, audio and other material to be edited to an output media product in a manner which does not depend on the order in which the individual media items (e.g. video shots) were captured.

The schematic display screen of FIG. 20 includes a viewer area 900, in which video clips be may viewed, a set of clip icons 910, to be described further below and a "timeline" 920 including representations of edited video shots 930, each shot optionally containing a picture stamp 940 indicative of the content of that shot.

At one level, the face picture stamps derived as described with reference to FIGS. 19a to 19c could be used as the picture stamps 940 of each edited shot so, within the edited length of the shot, which may be shorter than the originally captured shot, the picture stamp representing a face detection which resulted in the highest face probability value can be inserted onto the time line to show a representative image from that shot. The probability values may be compared with a threshold, possibly higher than the basic face detection threshold, so that only face detections having a high level of confidence are used to generate picture stamps in this way. If more than one face is detected in the edited shot, the face with the highest probability may be displayed, or alternatively more than one face picture stamp may be displayed on the time line.

Time lines in non-linear editing systems are usually capable of being scaled, so that the length of line corresponding to the full width of the display screen can represent various different time periods in the output media product. So, for example, if a particular boundary between two adjacent shots is being edited to frame accuracy, the time line may be "expanded" so that the width of the display screen represents a relatively short time period in the output media product. On the other hand, for other purposes such as visualising an overview of the output media product, the time line scale may be contracted so that a longer time period may be viewed across the width of the display screen. So, depending on the level of expansion or contraction of the time line scale, there may be less or more screen area available to display each edited shot contributing to the output media product.

In an expanded time line scale, there may well be more than enough room to fit one picture stamp (derived as shown in FIGS. 19a to 19c) for each edited shot making up the output media product. However, as the time line scale is contracted, this may no longer be possible. In such cases, the shots may be grouped together in to "sequences", where each sequence is such that it is displayed at a display screen size large enough to accommodate a phase picture stamp. From within the sequence, then, the face picture stamp having the highest corresponding probability value is selected for display. If no face is detected within a sequence, an arbitrary image, or no image, can be displayed on the timeline.

FIG. 20 also shows schematically two "face timelines" 925, 935. These scale with the "main" timeline 920. Each face timeline relates to a single tracked face, and shows the portions of the output edited sequence containing that tracked face. It is possible that the user may observe that certain faces relate to the same person but have not been associated with one another by the tracking algorithm. The user can "link" these faces by selecting the relevant parts of the face timelines (using a standard Windows® selection technique for multiple items) and then clicking on a 'link' screen button (not shown). The face timelines would then reflect the linkage of the whole group of face detections into one longer tracked face. FIGS. 21a and 21b schematically illustrate two variants of clip icons 910' and 910". These are displayed on the display screen of FIG. 20 to allow the user to select individual clips for inclusion in the time line and editing of their start and end positions (in and out points). So, each clip icon represents the whole of a respective clip stored on the system.

In FIG. 21a, a clip icon 910" is represented by a single face picture stamp 912 and a text label area 914 which may include, for example, time code information defining the position and length of that clip. In an alternative arrangement shown in FIG. 21b, more than one face picture stamp 916 may be included by using a multi-part clip icon.

Another possibility for the clip icons 910 is that they provide a "face summary" so that all detected faces are shown as a set of clip icons 910, in the order in which they appear (either in the source material or in the edited output sequence). Again, faces that are the same person but which have not been associated with one another by the tracking algorithm can be linked by the user subjectively observing that they are the same face. The user could select the relevant face clip icons 910 (using a standard Windows® selection technique for multiple items) and then click on a "link" screen button (not shown). The tracking data would then reflect the linkage of the whole group of face detections into one longer tracked face.

A further possibility is that the clip icons 910 could provide a hyperlink so that the user may click on one of the icons 910 which would then cause the corresponding clip to be played in the viewer area 900.

A similar technique may be used in, for example, a surveillance or closed circuit television (CCIV) system. Whenever a face is tracked, or whenever a face is tracked for at least a predetermined number of frames, an icon similar to a clip icon 910 is generated in respect of the continuous portion of video over which that face was tracked. The icon is displayed in a similar manner to the clip icons in FIG. 20. Clicking on an icon causes the replay (in a window similar to the viewer area 900) of the portion of video over which that particular face was tracked. It will be appreciated, that multiple different faces could be tracked in this way, and that the corresponding portions of video could overlap or even completely coincide.

FIGS. 22a to 22c schematically illustrate a gradient pre-processing technique.

It has been noted that image windows showing little pixel variation can tend to be detected as faces by a face detection arrangement based on eigenfaces or eigenblocks. Therefore, a pre-processing step is proposed to remove areas of little pixel variation from the face detection process. In the case of a multiple scale system (see above) the pre-processing step can be carried out at each scale.

The basic process is that a "gradient test" is applied to each possible window position across the whole image. A predetermined pixel position for each window position, such as the pixel at or nearest the centre of that window position, is flagged or labelled in dependence on the results of the test applied to that window. If the test shows that a window has little pixel variation, that window position is not used in the face detection process.

A first step is illustrated in FIG. 22a. This shows a window at an arbitrary window position in the image. As mentioned above, the pre-processing is repeated at each possible window position. Referring to FIG. 22a, although the gradient pre-processing could be applied to the whole window, it has been found that better results are obtained if the pre-processing is applied to a central area 1000 of the test window 1010.

Referring to FIG. 22b, a gradient-based measure is derived from the window (or from the central area of the window as shown in FIG. 22a), which is the average of the absolute differences between all adjacent pixels 1011 in both the horizontal and vertical directions, taken over the window. Each window centre position is labelled with this gradient-based measure to produce a gradient "map" of the image. The resulting gradient map is then compared with a threshold gradient value. Any window positions for which the gradient-based measure lies below the threshold gradient value are excluded from the face detection process in respect of that image.

Alternative gradient-based measures, could be used, such as the pixel variance or the mean absolute pixel difference from a mean pixel value.

The gradient-based measure is preferably carried out in respect of pixel luminance values, but could of course be applied to other image components of a colour image.

FIG. 22c schematically illustrates a gradient map derived from an example image. Here a lower gradient area 1070 (shown shaded) is excluded from face detection, and only a higher gradient area 1080 is used. The embodiments described above have related to a face detection system (involving training and detection phases) and possible uses for it in a camera-recorder and an editing system. It will be appreciated that there are many other possible uses of such techniques, for example (and not limited to) security surveillance systems, media handling in general (such as video tape recorder controllers), video conferencing systems and the like.

In other embodiments, window positions having high pixel differences can also be flagged or labelled, and are also excluded from the face detection process. A "high" pixel difference means that the measure described above with respect to FIG. 22b exceeds an upper threshold value.

So, a gradient map is produced as described above. Any positions for which the gradient measure is lower than the (first) threshold gradient value mentioned earlier are excluded from face detection processing, as are any positions for which the gradient measure is higher than the upper threshold value.

It was mentioned above that the "lower threshold" processing is preferably applied to a central part 1000 of the test window 1010. The same can apply to the "upper threshold" processing. This would mean that only a single gradient measure needs to be derived in respect of each window position. Alternatively, if the whole window is used in respect of the lower threshold test, the whole window can similarly be used in respect of the upper threshold test. Again, only a single gradient measure needs to be derived for each window position. Of course, however, it is possible to use two different arrangements, so that (for example) a central part 1000 of the test window 1010 is used to derive the gradient measure for the lower threshold test, but the full test window is used in respect of the upper threshold test.

A further criterion for rejecting a face track, mentioned earlier, is that its variance or gradient measure is very low or very high.

In this technique a tracked face position is validated by variance from area of interest map. Only a face-sized area of the map at the detected scale is stored per face for the next iteration of tracking.

Despite the gradient pre-processing described above, it is still possible for a skin colour tracked or Kalman predicted face to move into a (non-face-like) low or high variance area of the image. So, during gradient pre-processing, the variance values (or gradient values) for the areas around existing face tracks are stored.

When the final decision on the face's next position is made (with any acceptance type, either face detection, skin colour or Kalman prediction) the position is validated against the stored variance (or gradient) values in the area of interest map. If the position is found to have very high or very low variance (or gradient), it is considered to be non-face-like and the face track is terminated. This prevents face tracks from wandering onto low (or high) variance background areas of the image.

Alternatively, even if gradient pre-processing is not used, the variance of the new face position can be calculated afresh. In either case the variance measure used can either be traditional variance or the sum of differences of neighbouring pixels (gradient) or any other variance-type measure.

FIG. 23 schematically illustrates a video conferencing system. Two video conferencing stations 1100, 1110 are connected by a network connection 1120 such as: the Internet, a local or wide area network, a telephone line, a high bit rate leased line, an ISDN line etc. Each of the stations comprises; in simple terms, a camera and associated sending apparatus 1130 and a display and associated receiving apparatus 1140. Participants in the video conference are viewed by the camera at their respective station and their voices are picked up by one or more microphones (not shown in FIG. 23) at that station. The audio and video information is transmitted via the network 1120 to the receiver 1140 at the other station. Here, images captured by the camera are displayed and the participants' voices are produced on a loudspeaker or the like.

It will be appreciated that more than two stations may be involved in the video conference, although the discussion here will be limited to two stations for simplicity.

FIG. 24 schematically illustrates one channel, being the connection of one camera/sending apparatus to one display/receiving apparatus.

At the camera/sending apparatus, there is provided a video camera 1150, a face detector 1160 using the techniques described above, an image processor 1170 and a data formatter and transmitter 1180. A microphone 1190 detects the participants' voices.

Audio, video and (optionally) metadata signals are transmitted from the formatter and transmitter 1180, via the network connection 1120 to the display/receiving apparatus 1140. Optionally, control signals are received via the network connection 1120' from the display/receiving apparatus 1140.

At the display/receiving apparatus, there is provided a display and display processor 1200, for example a display screen and associated electronics, user controls 1210 and an audio output arrangement 1220 such as a digital to analogue (DAC) converter, an amplifier and a loudspeaker.

In general terms, the face detector 1160 detects (and optionally tracks) faces in the captured images from the camera 1150. The face detections are passed as control signals to the image processor 1170. The image processor can act in various different ways, which will be described below, but fundamentally the image processor 1170 alters the images captured by the camera 1150 before they are transmitted via the network 1120. A significant purpose behind this is to make better use of the available bandwidth or bit rate which can be carried by the network connection 1120. Here it is noted that in most commercial applications, the cost of a network connection 1120 suitable for video conference purposes increases with an increasing bit rate requirement. At the formatter and transmitter 1180 the images from the image processor 1170 are combined with audio signals from the microphone 1190 (for example, having been converted via an analogue to digital converter (ADC)) and optionally metadata defining the nature of the processing carried out by the image processor 1170.

Various modes of operation of the video: conferencing system will be described below.

FIG. 25 is a further schematic representation of the video conferencing system. Here, the functionality of the face detector 1160, the image processor 1170, the formatter and transmitter 1180 and the processor aspects of the display and display processor 1200 are carried out by programmable personal computers 1230. The schematic displays shown on the display screens (part of 1200) represent one possible mode of video conferencing using face detection which will be described below with reference to FIG. 31, namely that only those image portions containing faces are transmitted from one location to the other, and are then displayed in a tiled or mosaic-form at the other location. As mentioned, this mode of operation will be discussed below.

FIG. 26 is a flowchart schematically illustrating a mode of operation of the system of FIGS. 23 to 25. The flowcharts of FIGS. 26, 28, 31, 33 and 34 are divided into operations carried out at the camera/sender end (1130) and those carried out at the display/receiver end (1140).

So, referring to FIG. 26, the camera 1150 captures images at a step 1300. At a step 1310, the face detector 1160 detects faces in the captured images. Ideally, face tracking (as described above) is used to avoid any spurious interruptions in the face detection and to provide that a particular person's face is treated in the same way throughout the video conferencing session.

At a step 1320, the image processor 1170 crops the captured images in response to the face detection information. This may be done as follows:
  first, identify the upper left-most face detected by the face detector 1160
  detect the upper left-most extreme of that face; this forms the upper left corner of the cropped image
  repeat for the lower right-most face and the lower right-most extreme of that face to form the lower right corner of the cropped image
  crop the image in a rectangular shape based on these two co-ordinates.

The cropped image is then transmitted by the formatter and transmitted 1180. In this instance, there is no need to transmit additional metadata. The cropping of the image allows either a reduction in bit rate compared to the fill image or an improvement in transmission quality while maintaining the same bit rate.

At the receiver, the cropped image is displayed at a full screen display at a step 1130.

Optionally, a user control 1210 can toggle the image processor 1170 between a mode in which the image is cropped and a mode in which it is not cropped. This can allow the participants at the receiver end to see either the whole room or just the face-related parts of the image.

Another technique for cropping the image is as follows:
  identify the leftmost and rightmost faces
  maintaining the aspect ratio of the shot, locate the faces in the upper half of the picture.

In an alternative to cropping, the camera could be zoomed so that the detected faces are featured more significantly in the transmitted images. This could, for example, be combined with a bit rate reduction technique on the resulting image. To achieve this, a control of the directional (pan/tilt) and lens zoom properties of the camera is made available to the image processor (represented by a dotted line 1155 in FIG. 24).

FIGS. 27a and 27b are example images relating to the flowchart of FIG. 26. FIG. 27a represents a full screen image as captured by the camera 1150, whereas FIG. 27b represents a zoomed version of that image.

FIG. 28 is a flowchart schematically illustrating another mode of operation of the system of FIGS. 23 to 25. Step 1300 is the same as that shown in FIG. 26.

At a step 1340, each face in the captured images is identified and highlighted, for example by drawing a box around that face for display. Each face is also labelled, for example with an arbitrary label a, b, c . . . . Here, face tracking is particularly useful to avoid any subsequent confusion over the labels. The labelled image is formatted and transmitted to the receiver where it is displayed at a step 1350. At a step 1360, the user selects a face to be displayed, for example by typing the label relating to that face. The selection is passed as control data back to the image processor 1170 which isolates the required face at a step 1370. The required face is transmitted to the receiver. At a step 1380 the required face is displayed. The user is able to select a different face by the step 1360 to replace the currently displayed face. Again, this arrangement allows a potential saving in bandwidth, in that the selection screen may be transmitted at a lower bit rate because it is only used for selecting a face to be displayed. Alternatively, as before, the individual faces, once selected, can be transmitted at an enhanced bit rate to achieve a better quality image.

FIG. 29 is an example image relating to the flowchart of FIG. 28. Here, three faces have been identified, and are labelled a, b and c. By typing one of those three letters into the user controls 1210, the user can select one of those faces for a full-screen display. This can be achieved by a cropping of the main image or by the camera zooming onto that face as described above. FIG. 30 shows an alternative representation, in which so-called thumbnail images of each face are displayed as a menu for selection at the receiver.

FIG. 31 is a flowchart schematically illustrating a further mode of operation of the system of FIGS. 23 to 25. The steps 1300 and 1310 correspond to those of FIG. 26.

At a step 1400, the image processor 1170 and the formatter and transmitter 1180 co-operate to transmit only thumbnail images relating to the captured faces. These are displayed as a menu or mosaic of faces at the receiver end at a step 1410. At a step 1420, optionally, the user can select just one face for enlarged display. This may involve keeping the other faces displayed in a smaller format on the same screen or the other faces may be hidden while the enlarged display is used. So a difference between this arrangement and that of FIG. 28 is that thumbnail images relating to all of the faces are transmitted to the receiver, and the selection is made at the receiver end as to how the thumbnails are to be displayed.

FIG. 32 is an example image relating to the flowchart of FIG. 31. Here, an initial screen could show three thumbnails, 1430, but the stage illustrated by FIG. 32 is that the face belonging to participant c has been selected for enlarged display on a left hand part of the display screen. However, the thumbnails relating to the other participants are retained so that the user can make a sense selection of a next face to be displayed in enlarged form.

It should be noted that, at least in a system where the main image is cropped, the thumbnail images referred to in these examples are "live" thumbnail images, albeit taking into account any processing delays present in the system. That is to say, the thumbnail images vary in time, as the captured images of the participants vary. In a system using a camera zoom, then the thumbnails could be static or a second camera could be used to capture the wider angle scene.

FIG. 33 is a flowchart schematically illustrating a further mode of operation. Here, the steps 1300 and 1310 correspond to those of FIG. 26.

At a step 1440 a thumbnail face image relating to the face detected to be nearest to an active microphone is transmitted. Of course, this relies on having more than one microphone and also a pre-selection or metadata defining which participant is sitting near to which microphone. This can be set up in advance by a simple menu-driven table entry by the users at each video conferencing station. The active microphone is considered to be the microphone having the greatest magnitude audio signal averaged over a certain time (such as one second). A low pass filtering arrangement can be used to avoid changing the active microphone too often, for example in response to a cough or an object being dropped, or two participants speaking at the same time.

At a step 1450 the transmitted face is displayed. A step 1460 represents the quasi-continuous detection of a current active microphone.

The detection could be, for example, a detection of a single active microphone or alternatively a simple triangulation technique could detect the speaker's position based on multiple microphones.

Finally, FIG. 34 is a flowchart schematically illustrating another mode of operation, again in which the steps 1300 and 1310 correspond to those of FIG. 26.

At a step 1470 the parts of the captured images immediately surrounding each face are transmitted at a higher resolution and the background (other parts of the captured images) is transmitted at a lower resolution. This can achieve a useful saving in bit rate or allow an enhancement of the parts of the image surrounding each face. Optionally, metadata can be transmitted defining the position of each face, or the positions may be derived at the receiver by noting the resolution of different parts of the image.

At a step 1480, at the receiver end the image is displayed and the faces are optionally labelled for selection by a user at a step 1490 this selection could cause the selected face to be displayed in a larger format similar to the arrangement of FIG. 32.

Although the description of FIGS. 23 to 34 has related to video conferencing systems, the same techniques could be applied to, for example, security monitoring (CCTV) systems. Here; a return channel is not normally required, but an arrangement as shown in FIG. 24, where the camera/sender arrangement is provided as a CCTV camera, and the receiver/display arrangement is provided at a monitoring site, could use the same techniques as those described for video conferencing.

It will be appreciated that the embodiments of the invention described above may of course be implemented, at least in part, using software-controlled data processing apparatus. For example, one or more of the components schematically illustrated or described above may be implemented as a software-controlled general purpose data processing device or a bespoke program controlled data processing device such as an application specific integrated circuit, a field programmable gate array or the like. It will be appreciated that a computer program providing such software or program control and a storage, transmission or other providing medium by which such a computer program is stored are envisaged as aspects of the present invention.

The list of references and appendices follow. For the avoidance of doubt, it is noted that the list and the appendices form a part of the present description. These documents are all incorporated by reference.

REFERENCES

1. H. Schneiderman and T. Kanade, "A statistical model for 3D object detection applied to faces and cars," IEEE Conference on Computer Vision and Pattern Detection, 2000.
2. H. Schneiderman and T. Kanade, "Probabilistic modelling of local appearance and spatial relationships for object detection," IEEE Conference on Computer Vision and Pattern Detection, 1998.

3. H. Schneiderman, "A statistical approach to 3D object detection applied to faces and cars," PhD thesis, Robotics Institute, Carnegie Mellon University, 2000.
4. E. Hjelmas and B. K. Low, "Face Detection: A Survey," Computer-Vision and Image Understanding, no. 83, pp. 236-274, 2001.
5. M.-H. Yang, D. Kriegman and N. Ahuja, "Detecting Faces in Images: A Survey," IEEE Trans. on Pattern Analysis and Machine Intelligence, vol. 24, no. 1, pp. 34-58, January 2002.

Appendix A: Training Face Sets

One database consists of many thousand images of subjects standing in front of an indoor background. Another training database used in experimental implementations of the above techniques; consists of more than ten thousand eight-bit greyscale images of human heads with views ranging from frontal to left and right profiles. The skilled man will of course understand that various different training sets could be used, optionally being profiled to reflect facial characteristics of a local population.

Appendix B—Eigenblocks

In the eigenface approach to face detection and recognition (References 4 and 5), each m-by-n face image is reordered so that it is represented by a vector of length mn. Each image can then be thought of as a point in mn-dimensional space. A set of images maps to a collection of points in this large space.

Face images, being similar in overall configuration, are not randomly distributed in this mn-dimensional image space and therefore they can be described by a relatively low dimensional subspace. Using principal component analysis (PCA), the vectors that best account for the distribution of face images within the entire image space can be found. PCA involves determining the principal eigenvectors of the covariance matrix corresponding to the original face images. These vectors define the subspace of face images, often referred to as the face space. Each vector represents an m-by-n image and is a linear combination of the original face images. Because the vectors are the eigenvectors of the covariance matrix corresponding to the original face images, and because they are face-like in appearance, they are often referred to as eigenfaces [4].

When an unknown image is presented, it is projected into the face space. In this way, it is expressed in terms of a weighted sum of eigenfaces.

In the present embodiments, a closely related approach is used, to generate and apply so-called "eigenblocks" or eigenvectors relating to blocks of the face image. A grid of blocks is applied to the face image (in the training set) or the test window (during the detection phase) and an eigenvector-based process, very similar to the eigenface process, is applied at each block position. (Or in an alternative embodiment to save on data processing, the process is applied once to the group of block positions, producing one set of eigenblocks for use at any block position). The skilled man will understand that some blocks, such as a central block often representing a nose feature of the image, may be more significant in deciding whether a face is present.

Calculating Eigenblocks

The calculation of eigenblocks involves the following steps:

(1). A training set of $N_T$ images is used. These are divided into image blocks each of size m×n. So, for each block position a set of image blocks, one from that position in each image, is obtained:

$$\{I_o^t\}_{t=1}^{N_T}.$$

(2). A normalised training set of blocks $$\{I^t\}_{t=1}^{N_T},$$

is calculated as follows:

Each image block, $I_o^t$, from the original training set is normalised to have a mean of zero and an L2-norm of 1, to produce a respective normalised image block, $I^t$. For each image block, $I_o^t$, t=1 ... $N_T$:

$$I^t = \frac{I_o^t - \text{mean\_}I_o^t}{\|I_o^t - \text{mean\_}I_o^t\|}$$

where $\text{mean\_}I_o^t = \frac{1}{mn}\sum_{i=1}^{m}\sum_{j=1}^{n} I_o^t[i,j]$ and $\|I_o^t - \text{mean\_}I_o^t\| = \sqrt{\sum_{i=1}^{m}\sum_{j=1}^{n}(I_o^t[i,j] - \text{mean\_}I_o^t)^2}$ (i.e. the L2-norm of ($I_o^t$−mean_$I_o^t$))

(3). A training set of vectors $$\{x^t\}_{t=1}^{N_T}$$

is formed by lexicographic reordering of the pixel elements of each image block, $I^t$. i.e. Each m-by-n image block, $I^t$, is reordered into a vector, $x^t$, of length N=nm.

(4). The set of deviation vectors, $$D = \{x^t\}_{t=1}^{N_T},$$

is calculated. D has N rows and $N_T$ columns.

(5). The covariance matrix, $\Sigma$, is calculated:

$$\Sigma = DD^T$$

$\Sigma$ is a symmetric matrix of size N×N.

(7). The whole set of eigenvectors, P, and eigenvalues, $\lambda_i$, i=1, ..., N, of the covariance matrix, $\Sigma$, are given by solving:

$$\Lambda = P^T \Sigma P$$

Here, $\Lambda$ is an N×N diagonal matrix with the eigenvalues, $\lambda_i$, along its diagonal (in order of magnitude) and P is an N×N matrix containing the set of N eigenvectors, each of length N. This decomposition is also known as a Karhunen-Loeve Transform (KLT).

The eigenvectors can be thought of as a set of features that together characterise the variation between the blocks of the face images. They form an orthogonal basis by which any image block can be represented, i.e. in principle any image can be represented without error by a weighted sum of the eigenvectors.

If the number of data points in the image space (the number of training images) is less than the dimension of the space ($N_T$<N), then there will only be $N_T$ meaningful eigenvectors. The remaining eigenvectors will have associated eigenvalues of zero. Hence, because typically $N_T$<N, all eigenvalues for which i>$N_T$ will be zero.

Additionally, because the image blocks in the training set are similar in overall configuration (they are all derived from faces), only some of the remaining eigenvectors will characterise very strong differences between the image blocks. These are the eigenvectors with the largest associated eigenvalues. The other remaining eigenvectors with smaller associated eigenvalues do not characterise such large differences and therefore they are not as useful for detecting or distinguishing between faces.

Therefore, in PCA, only the M principal eigenvectors with the largest magnitude eigenvalues are considered, where M<$N_T$ i.e. a partial KLT is performed. In short, PCA extracts a lower-dimensional subspace of the KLT basis corresponding to the largest magnitude eigenvalues.

Because the principal components describe the strongest variations between the face images, in appearance they may resemble parts of face blocks and are referred to here as eigenblocks. However, the term eigenvectors could equally be used.

Face Detection using Eigenblocks

The similarity of an unknown image to a face, or its faceness, can be measured by determining how well the image is represented by the face space. This process is carried out on a block-by-block basis, using the same grid of blocks as that used in the training process.

The first stage of this process involves projecting the image into the face space.

Projection of an Image into Face Space

Before projecting an image into face space, much the same preprocessing steps are performed on the image as were performed on the training set (1). A test image block of size m×n is obtained: $I_o$.

(2). The original test image block, $I_o$ is normalised to have a mean of zero and an L2-norm of 1, to produce the normalised test image block, I:

$$I = \frac{I_o - \text{mean}\_I_o}{\|I_o - \text{mean}\_I_o\|}$$

where $\text{mean}\_I_o = \frac{1}{mn}\sum_{i=1}^{m}\sum_{j=1}^{n} I_o[i, j]$ and $\|I_o - \text{mean}\_I_o\| = \sqrt{\sum_{i=1}^{m}\sum_{j=1}^{n}(I_o[i, j] - \text{mean}\_I_o)^2}$ (i.e. the L2-norm of ($I_o$−mean_$I_o$))

(3). The deviation vectors are calculated by lexicographic reordering of the pixel elements of the image. The image is reordered into a deviation vector, $x^t$, of length N=nm.

After these pre-processing steps, the deviation vector, x, is projected into face space using the following simple step:

(4). The projection into face space involves transforming the deviation vector, x, into its eigenblock components. This involves a simple multiplication by the M principal eigenvectors (the eigenblocks), $P_i$, i=1, . . . , M. Each weight $y_i$ is obtained as follows:

$$y_i = P_i^T x$$

where $P_i$ is the $i^{th}$ eigenvector.

The weights $y_i$, i=1, . . . , M, describe the contribution of each eigenblock in representing the input face block.

Blocks of similar appearance will have similar sets of weights while blocks of different appearance will have different sets of weights. Therefore, the weights are used here as feature vectors for classifying face blocks during face detection.

The invention claimed is:

1. A video camera arrangement comprising:
an image capture device having an associated lens with an adjustable focus and a zoom setting;
a face detector for detecting human faces in images captured by the image capture device and for generating face data identifying detected occurrences of faces in the captured images, the face detector (1) configured to detect faces at a plurality of different image scales by resealing the captured images over the image scales, and (2) receiving a lens focus and a zoom setting from the image capture device to (a) determine a distance of a face from the video camera to calculate an expected face size, and (b) calculate a subset of the image scales for face detection within the captured images based on the expected face size;
a data handling medium by which data representing the captured images is transmitted and/or stored, the data handling medium comprising a storage medium for storing the captured images and a metadata store for storing metadata associated with the captured images, the metadata including the face data generated by the face detector, the lens focus and the zoom setting; and
a processor for generating data to be transmitted or stored by the data handling medium in dependence on the detection of faces in the captured images.

2. A camera arrangement according to claim 1, in which the metadata store is arranged to store metadata on the same storage medium as the captured video material.

3. A camera arrangement according to claim 1, in which the metadata store comprises a removable storage device connectable to the camera arrangement.

4. A camera arrangement according to claim 1, in which the metadata store comprises:
a storage device external to the camera arrangement; and
a wireless link between the camera arrangement and the storage device.

5. A camera arrangement according to claim 1, in which:
the face detector is operable to detect a probability of a human face being present in each field or frame of the captured video material; and
the metadata store is operable to store a representation of at least one face from each contiguous sequence of captured video material, that face being the face having the highest associated probability from the contiguous sequence.

6. A camera arrangement according to claim 1, the camera arrangement being a unitary device.

7. A camera arrangement according to claim 1, the data handling medium being operable to store and/or transmit data representing captured audio material associated with the captured video material.

8. A camera arrangement according to claim 7, comprising a speech detector; and in which the face detector is responsive to a detection of speech in the captured audio material.

9. A camera arrangement according to claim 7, having two or more associated microphones, the processor and/or face detector being responsive to audio signals from the microphones to identify a face associated with a current speaker.

10. A camera arrangement according to claim 7, comprising logic, responsive to the face detector, to derive a subset of at least some of the captured images for storage and/or transmission by the data handling medium.

11. A camera arrangement according to claim 10, in which the subset comprises a cropped image containing at least each face detected by the face detector.

12. A camera arrangement according to claim 10, in which the subset, in respect of a captured image, comprises a number of cropped images equal to the number of detected faces in that captured image, each cropped image representing one detected face.

13. A camera arrangement according to claim 10, comprising a user control for selecting display properties of each of the cropped images.

14. A camera arrangement according to claim 13, in which: the data handling medium is a transmission medium; and the user control relates to a remote node of the transmission medium.

15. A camera arrangement according to claim 10, in which the subset, in respect of a captured image, comprises a cropped image representing a single detected face.

16. A camera arrangement according to claim 7, comprising logic to alter a degree of data compression applied to portions of the image in dependence upon whether a face has been detected at those portions.

17. A camera arrangement according to claim 16, being operable to apply a harsher data compression to portions of a captured image not detected to contain a face.

18. A camera arrangement according to claim 7, comprising logic, responsive to the face detector, to control the lens zoom and/or direction of the image capture device in dependence upon the face data.

19. A video conferencing arrangement comprising two or more camera arrangements according to claim 7, each camera arrangement having an associated display arrangement, the data handling medium being a transmission medium linking the two or more camera arrangements.

20. A security monitoring arrangement comprising a camera arrangement according to claim 7.

21. The video camera arrangement according to claim 1, wherein the face detector is further responsive to a break between contiguous video shots to reset a face-tracking filter between the contiguous video shots.

22. A method of operating a video camera arrangement having an image capture device with an associated lens having an adjustable focus and a zoom setting, a storage medium for storing captured images and a metadata store for storing metadata associated with the captured video material, the method comprising the steps of:
  detecting human faces in captured images and generating face data identifying detected occurrences of faces in the captured images by a face detector configured to detect faces at a plurality of different image scales by rescaling the captured images over the image scales, the face detector receiving a lens focus and a zoom setting from the image capture device to (a) determine a distance of a face from the video camera to calculate an expected face size and (b) calculate a subset of the image scales for face detection within the captured images based on the expected face size; and
  generating data representing the captured images for storage and/or transmission, in dependence on the face data generated by the face detector, wherein
  metadata stored with the captured images includes the face data generated by the face detecting, the lens focus and the zoom setting.

23. A non-transitory computer readable storage medium having program code that when executed performs a method according to claim 22.

24. The non-transitory computer readable storage medium according to claim 23, further including a network for transmitting the program code for execution.

25. The method according to claim 22, wherein the face detecting is further responsive to a break between contiguous video shots to reset a face-tracking filter between the contiguous video shots.

26. A video camera arrangement comprising:
  an image capture device having an associated lens with an adjustable focus and a zoom setting;
  a face detector for detecting human faces in images captured by the image capture device and for generating face data identifying detected occurrences of faces in the captured images, the face detector (1) configured to detect faces at a plurality of different image scales by rescaling the captured images over the image scales, and (2) receiving a lens focus and a zoom setting from the image capture device to (a) determine a distance of a face from the video camera to calculate an expected face size and (b) calculate face detection weighting factors for the image scales to variably weight the image scales for face detection within the captured images based on the expected face size;
  a data handling medium by which data representing the captured images is transmitted and/or stored, the data handling medium comprising a storage medium for storing the captured images and a metadata store for storing metadata associated with the captured images, the metadata including the face data generated by the face detector, the lens focus and the zoom setting; and
  a processor for generating data to be transmitted or stored by the data handling medium in dependence on the detection of faces in the captured images.

27. A method of operating a video camera arrangement having an image capture device with an associated lens having an adjustable focus and a zoom setting, a storage medium for storing captured images and a metadata store for storing metadata associated with the captured video material, the method comprising the steps of:
  detecting human faces in captured images and generating face data identifying detected occurrences of faces in the captured images by a face detector configured to detect faces at a plurality of different image scales by rescaling the captured image over the image scales, the face detector receiving a lens focus and a zoom setting from the image capture device to (a) determine a distance of a face from the video camera to calculate an expected face size and (b) calculate face detection weighting factors for the image scales to variably weight the image scales for face detection within the captured images based on the expected face size; and
  generating data representing the captured images for storage and/or transmission, in dependence on the face data generated by the face detector, wherein
  metadata stored with the captured images includes the face data generated by the face detecting, the lens focus and the zoom setting.

* * * * *